United States Patent [19]
Welker et al.

[11] Patent Number: 5,812,876
[45] Date of Patent: *Sep. 22, 1998

[54] DMA CONTROLLER WHICH CAN BE CONTROLLED BY HOST AND LOCAL PROCESSORS

[75] Inventors: Mark W. Welker, Spring; John S. Thayer, Houston, both of Tex.

[73] Assignee: Compaq Computer Corporation, Houston, Tex.

[*] Notice: The term of this patent shall not extend beyond the expiration date of Pat. No. 5,598,579.

[21] Appl. No.: 780,019

[22] Filed: Dec. 20, 1996

Related U.S. Application Data

[63] Continuation of Ser. No. 234,847, Apr. 25, 1994, Pat. No. 5,598,579.

[51] Int. Cl.⁶ .................................................. G06F 15/02
[52] U.S. Cl. ............................................................. 395/842
[58] Field of Search .................................. 395/842, 843, 395/825, 850, 853, 882, 307, 287, 290, 293

[56] References Cited

U.S. PATENT DOCUMENTS

| | | | |
|---|---|---|---|
| 4,380,798 | 4/1983 | Shannon et al. | 395/729 |
| 4,594,657 | 6/1986 | Byrns | 395/729 |
| 4,754,398 | 6/1988 | Pribnow | 395/200.56 |
| 4,809,269 | 2/1989 | Gulick | 370/462 |
| 5,031,097 | 7/1991 | Kitakami et al. | 395/848 |
| 5,159,686 | 10/1992 | Chastain et al | 395/675 |
| 5,179,663 | 1/1993 | Iimura | 395/855 |
| 5,293,491 | 3/1994 | Leung et al. | 395/848 |
| 5,339,443 | 8/1994 | Lockwood | 395/732 |
| 5,367,690 | 11/1994 | Schiffleger | 711/213 |
| 5,434,970 | 7/1995 | Schiffleger | 395/200.43 |
| 5,485,624 | 1/1996 | Steinmetz et al. | 395/800.34 |
| 5,598,579 | 1/1997 | Welker et al. | 395/842 |
| 5,655,151 | 8/1997 | Bowes et al. | 395/842 |

*Primary Examiner*—Moustafa M. Meky
*Attorney, Agent, or Firm*—Pravel, Hewitt, Kimball & Krieger

[57] ABSTRACT

A computer system which includes a DMA controller on the local I/O unit which can be programmed by either the host processor or the local processor. Semaphore flags and lock bits are provided to allow determination of control of the local DMA controller and for passing information. Additionally, data alignment and padding circuitry is provided. The circuitry is informed of the logical data arrangement desired or utilized by the host processor or other devices and knows the data arrangement of the local processor. The circuitry properly obtains and realigns the data based on the transfer direction and data arrangement. The circuitry further properly zero pads the data when realignment is such that padding is necessary.

13 Claims, 22 Drawing Sheets

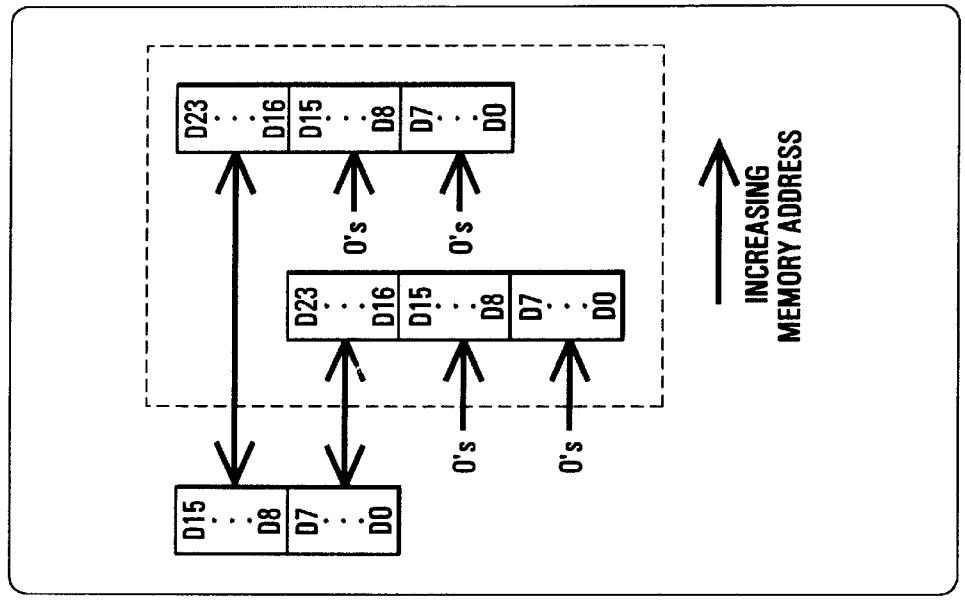
FIG. 11C SYS1 AND SYS2 8-BIT MODE
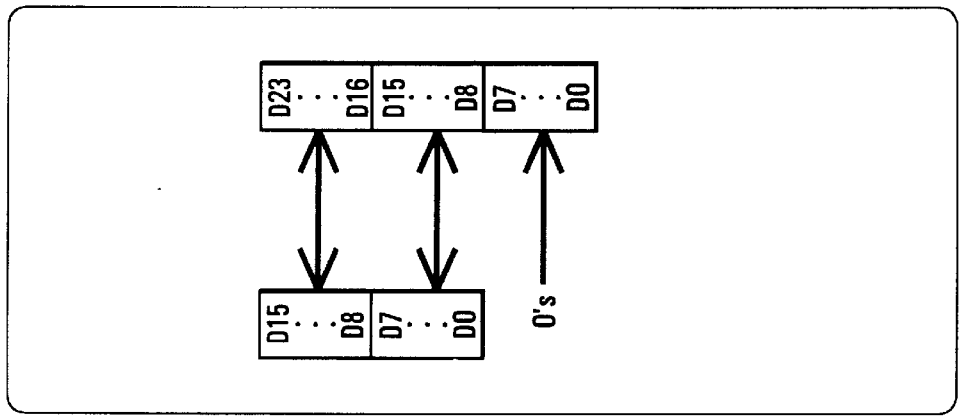
FIG. 11B SYS1 AND SYS2 16-BIT MODE
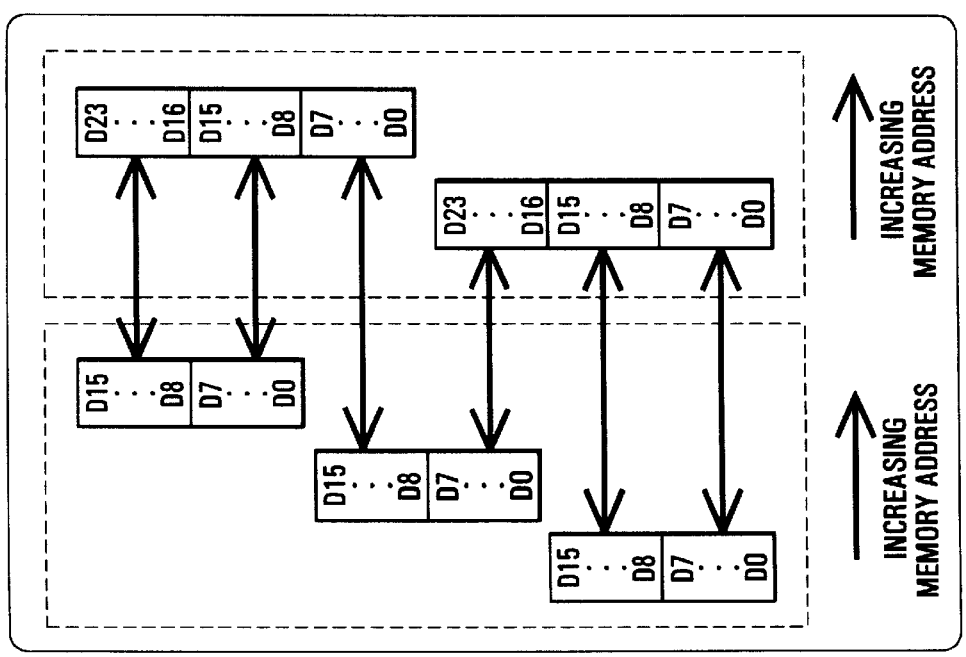
FIG. 11A SYS1 AND SYS2 24-BIT MODE

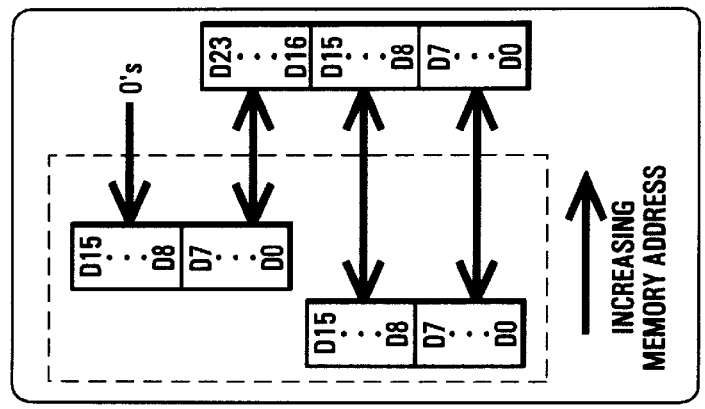
FIG. 11G SYS1 AND SYS2 32-BIT MODE
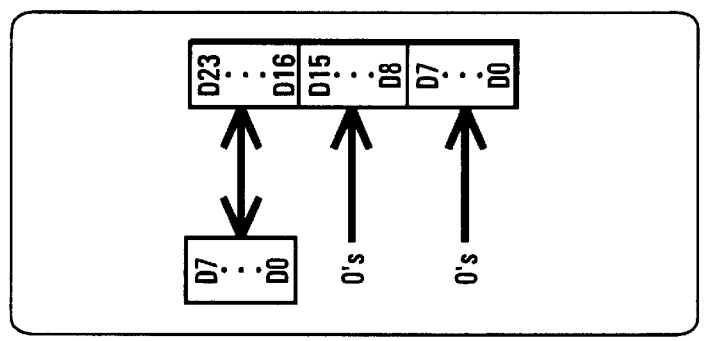
FIG. 11F Pbk AND Rec, SRx & STx 8-BIT MODE
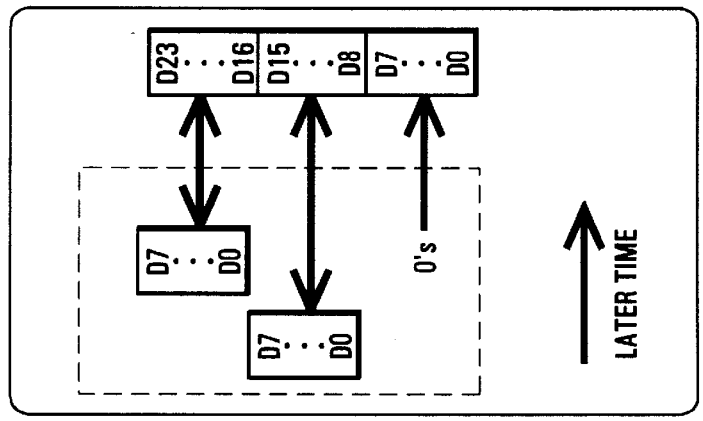
FIG. 11E Pbk AND Rec, SRx & STx 16-BIT MODE
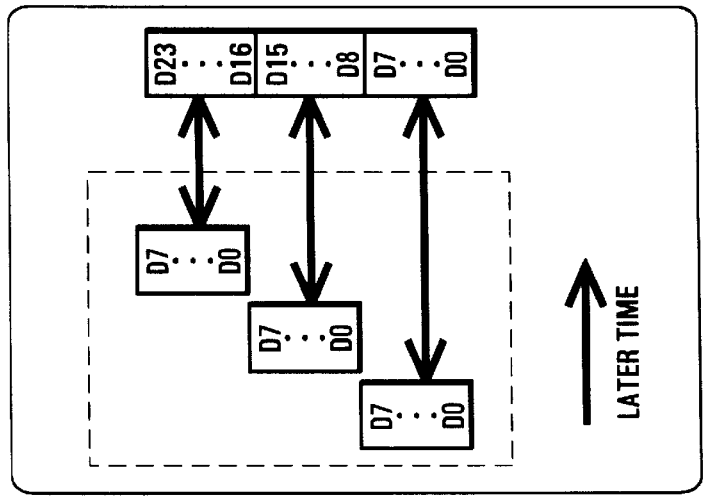
FIG. 11D Pbk AND Rec, SRx & STx 24-BIT MODE

DMA CONTROLLER WHICH CAN BE CONTROLLED BY HOST AND LOCAL PROCESSORS

This is a continuation of application Ser. No. 08/234,847 filed Apr. 25, 1994, now U.S. Pat. No. 5,598,579.

BACKGROUND OF THE INVENTION

1. Field of the Invention

The invention relates to direct memory access (DMA) controllers used in computer systems, and more particularly to a DMA controller which can be controlled by both a host processor in the computer system and a local processor performing input/output control operations.

2. Description of the Related Art

Modern computer systems are becoming ever more powerful. One way this power is being increased is by the use of multiple processors performing different functions. The most common case is the use of a host processor to perform the primary functions and local processors performing input/output (I/O) control and management functions. The host processor then has less processing to perform as more activities are performed by the local processors. By splitting up responsibilities in this fashion, overall system capabilities can increase.

However, certain problems can remain. For example, data must still be passed between the main memory used by the host processor and local memory used by the local processor. While this transfer can be somewhat simplified by the use of a direct memory access (DMA) controller in the host portion of the computer system, this still leaves problems of transferring the data in the local I/O unit. Conventionally this has required that the host processor control and program both the host DMA controller and any hardware used on the local I/O unit or that the local processor in the I/O unit obtain each data word being transferred. This greatly limits the flexibility of task sharing between the two processors, limiting performance improvements. Conventionally performance of the local processor is reduced due to the requirements of message passing or by waiting for the host processor to complete many operations and any data transfer processing. Therefore it is desirable to improve the control aspects of transferring the data inside the local I/O unit, particularly without extensive processor action.

Further, quite often the data sizes of the host computer and local I/O unit are different. For example, the host computer may utilize 16 bit words but the local processor may use 24 bit words. Further, in certain cases both units may operate with various differing width data. All of these options require that some data realignment and padding occur. Conventionally the data realignment and padding has been performed by one of the processors. This greatly decreases system performance because so much time is spent just properly organizing the data prior to its use. Therefore it is clearly desirable to automatically handle the data alignment between various alternatives and to provide proper padding at the same time, thus relieving the processors of this time consuming task.

SUMMARY OF THE PRESENT INVENTION

A computer system according to the present invention includes a DMA controller on the local I/O unit which can be programmed by either the host processor or the local processor. In this manner less message passing is required and each processor can perform the control functions for which it is best suited. Semaphore flags and lock bits are provided to allow determination of control of the local DMA controller and for passing information. The local DMA controller can then cooperate with the host computer DMA controller and all data transfer is performed without constant intervention by the processors.

Additionally, data alignment and padding circuitry is provided. The circuitry is informed of the logical data arrangement desired or utilized by the host processor or other devices and knows the data arrangement of the local processor. The circuitry then properly obtains and realigns the data based on the transfer direction and data arrangement. The circuitry further properly zero pads the data when realignment is such that padding is necessary. This automatic realignment and padding relieves the processors of this burden, improving overall performance.

BRIEF DESCRIPTION OF THE DRAWINGS

A better understanding of the present invention can be obtained when the following detailed description of the preferred embodiment is considered in conjunction with the following drawings, in which:

FIGS. 11A–11G are illustrations showing data realignment and zero padding according to the present invention;

DETAILED DESCRIPTION OF THE PREFERRED EMBODIMENT

Figure 1:
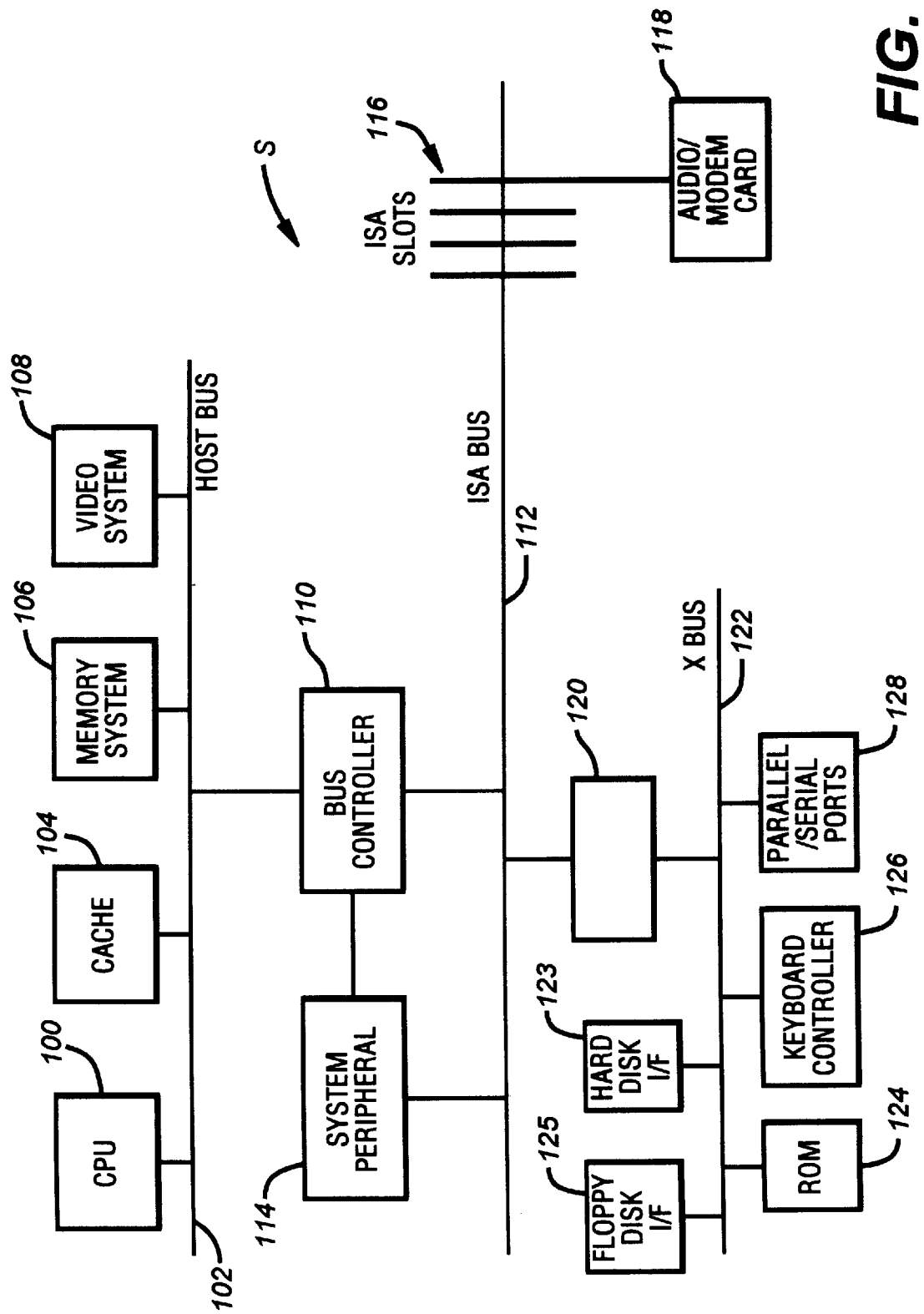
FIG. 1 is a block diagram of a computer system incorporating the present invention.

Proceeding now to FIG. 1, a computer system S generally according to the present invention is shown. The computer system S includes a host CPU or processor 100, which is conventionally a microprocessor such as a 486 or Pentium from Intel Corporation. A host bus 102 is connected to the CPU 100 to act as a first bus in the computer system S. A cache unit 104 is connected to the host bus 102 to cache memory operations of the CPU 100. A main memory system 106 is also connected to the host bus 102 to act as the main memory of the computer system S. A video system 108 is further connected to the host bus 102 to allow high performance operation of the video system 108.

A bus controller 110 is connected between the host bus 102 and an ISA or Industry Standard Architecture bus 112. A system peripheral 114 is connected to the bus controller 110 and the ISA bus 112. The system peripheral 114 includes certain common peripheral devices used in the computer system S such as timers, an interrupt controller and, of importance to this particular application, a DMA controller as conventional in IBM PC compatible computers. A number of ISA slots 116 for receiving interchangeable circuit cards are present on the ISA bus 112. In the preferred embodiment an audio/modem card 118 which incorporates the present invention in the preferred embodiment is located in one of the ISA slots 116. Appropriate buffer and transceiver logic 120 is connected between the ISA bus 112 and an X bus 122 which forms an additional input/output (I/O) bus in the computer system S. A read only memory or ROM 124, which contains the instructions forming the BIOS and other fundamental operations, is connected to the X bus 122. A keyboard controller 126 is connected to the X bus 122 to receive keyboard and pointing device inputs from a user. Parallel and serial 128 ports as are conventional are connected to the X bus 122 to provide certain I/O capabilities. A hard disk interface 123 and a floppy disk interface 125 are also connected to the X bus 122 to allow use of a hard disk drive and a floppy disk drive.

FIG. 1 illustrates an exemplary computer system and it is understood that other conventional computer systems having different architectures could be utilized and that the computer system S of FIG. 1 has been shown only for a representative embodiment to place the preferred embodiment of the invention in context.

Figure 2:
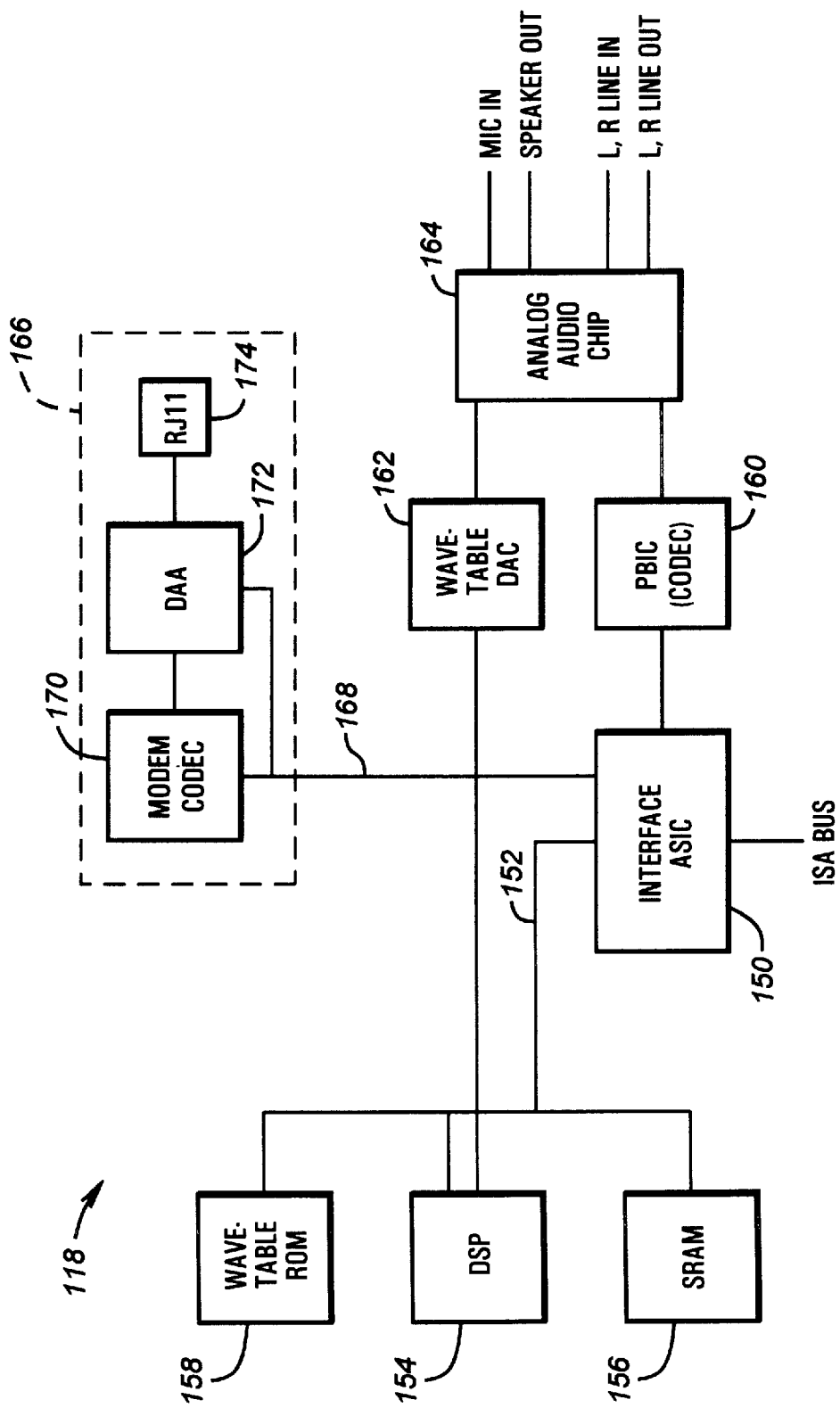
FIG. 2 is a block diagram of the audio/modem card of FIG. 1.

Referring now to FIG. 2, the audio/modem card 118 is shown in more detail. An interface application specific integrated circuit (ASIC) 150 forms the core of the audio/modem card 118. A DSP bus 152 is provided from the interface ASIC 150 and is connected to a DSP or digital signal processor 154, static random access memory or SRAM 156 which is utilized by the DSP 154 and, in the preferred embodiment, a wavetable ROM 158. The wavetable ROM 158 contains certain wavetable information used in audio output situations. The DSP 154 is preferably one of the many high performance DSPs available and in the preferred embodiment is the Motorola 56002. This DSP 154 is a 24 bit unit and can access 64K words of memory in several different address spaces. The interface ASIC 150 is further connected to an audio codec 160 referred to as the PBIC. Preferably the audio codec 160 is the AD1848 device made by Analog Devices. The DSP 154 is connected to a wavetable DAC or digital to analog converter 162. The wavetable DAC 162 takes the wavetable data from a wavetable ROM 158, as processed by the DSP 154, and converts it to an analog audio signal. The outputs of the audio codec 160 and the wavetable DAC 162 are provided to an analog audio chip 164, which contains amplifiers and mixing circuits. The analog audio chip 164 includes a microphone input, a speaker output and left and right line level inputs and outputs as conventional in audio systems.

A modem daughterboard 166 is connected to the interface ASIC 150 over a bus 168 having serial and parallel data transfer portions. A modem codec 170 is located on the daughterboard 166 and receives the bus 168 from the interface ASIC 150. A data access arrangement or DAA 172 is connected to the modem codec 170 and the interface ASIC 150. A telephone jack 174 is connected to the DAA 172 to provide an interface to the telephone system. Alternatively, the daughterboard 166 could contain other standard telephony interfaces, such as ISDN, or a high speed serial link for PBX or general purpose applications. The provision of the daughterboard 166 in conjunction with the DSP 154 allows low cost addition of modem functions, as indicated in copending file wrapper continuation application Ser. No. 08/404,942, now abandoned, entitled "Apparatus for Adding Modem Capabilities to a Computer System Equipped with a Digital Signal Processor," filed Mar. 15, 1995, which is hereby incorporated by reference. The parent application, Ser. No. 08/094,491, was filed on Jul. 19, 1993, and now abandoned.

Figure 3:
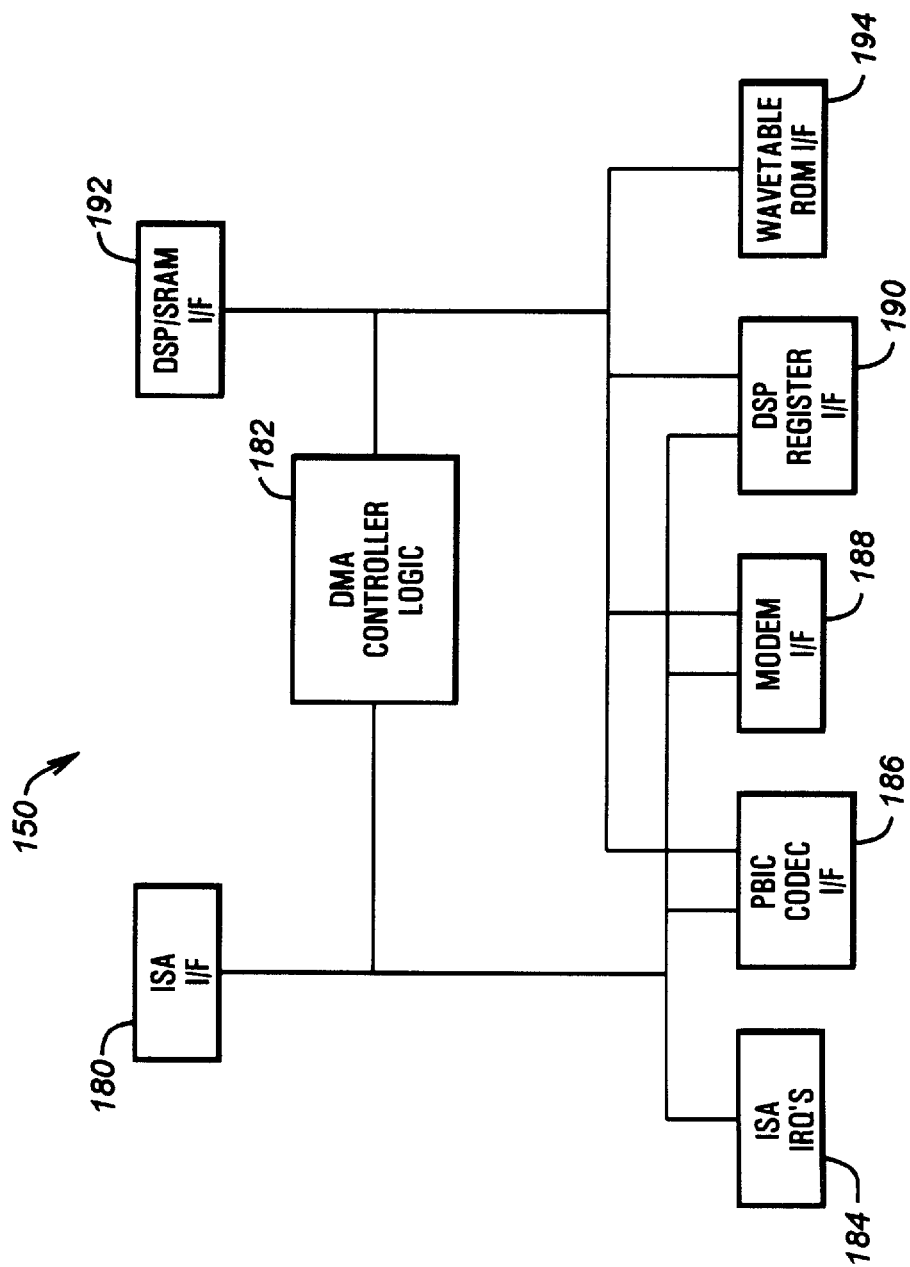
FIG. 3 is a block diagram of the interface ASIC of FIG. 2.

Referring now to FIG. 3, the general organization of the interface ASIC 150 is illustrated. The interface ASIC 150 has an ISA interface 180 which is connected to the ISA bus 112 via the ISA slot 116. The core of the interface ASIC 150 is DMA controller logic 182 which allows unassisted transfer of data between the SRAM 156 and ISA bus 112 and also between the SRAM 156 and the audio codec 160 and the daughterboard 166. The ISA interface 180 is connected to circuitry 184 which selects which interrupt or IRQ signals on the ISA bus 112 are to be utilized by the audio/modem card 188. Additionally, the ISA interface 180 is connected to an interface 186 to the audio codec 160, to an interface 188 which is connected to the daughterboard 166 and to an interface 190 which is connected to the DSP 154 to allow access to the internal registers in the DSP 154 and to provide DSP interrupt capabilities. A DSP/SRAM interface 192 is also present on the interface ASIC 150 and is connected to the DMA controller logic 182 to allow control of certain operations by the DSP 154. The DSP/SRAM interface 192 is also connected to the interface 186, the interface 188 and the interface 190 and to a wavetable ROM interface 194. As can be seen, both the host CPU 100 and the DSP 154 have access to the DMA controller logic 182. It is noted that the ISA interface 180 is preferably a 16 bit wide interface, whereas the DSP/SRAM interface 192 is preferably a 24 bit wide interface. The modem interface 188 is preferably includes both a serial channel and an 8 bit wide bus, while the codec interface 186 is preferably an 8 bit link. This will be seen in more detail below.

Because of the common connection or location of the DMA controller logic 182, both the ISA interface 180 and the DSP/SRAM interface 192 can be utilized by the appropriate devices to program the DMA controller logic 182 as will be explained in more detail below. Further, the DMA controller logic 182 provides the necessary conversions to properly place data from the 8 and 16 bit devices into the SRAM 156 at the proper locations or to convert data present in the SRAM 156 to the proper locations for use by the 8 and 16 bit devices, depending upon on the transfer width and data packing mode of interest.

Figure 4:
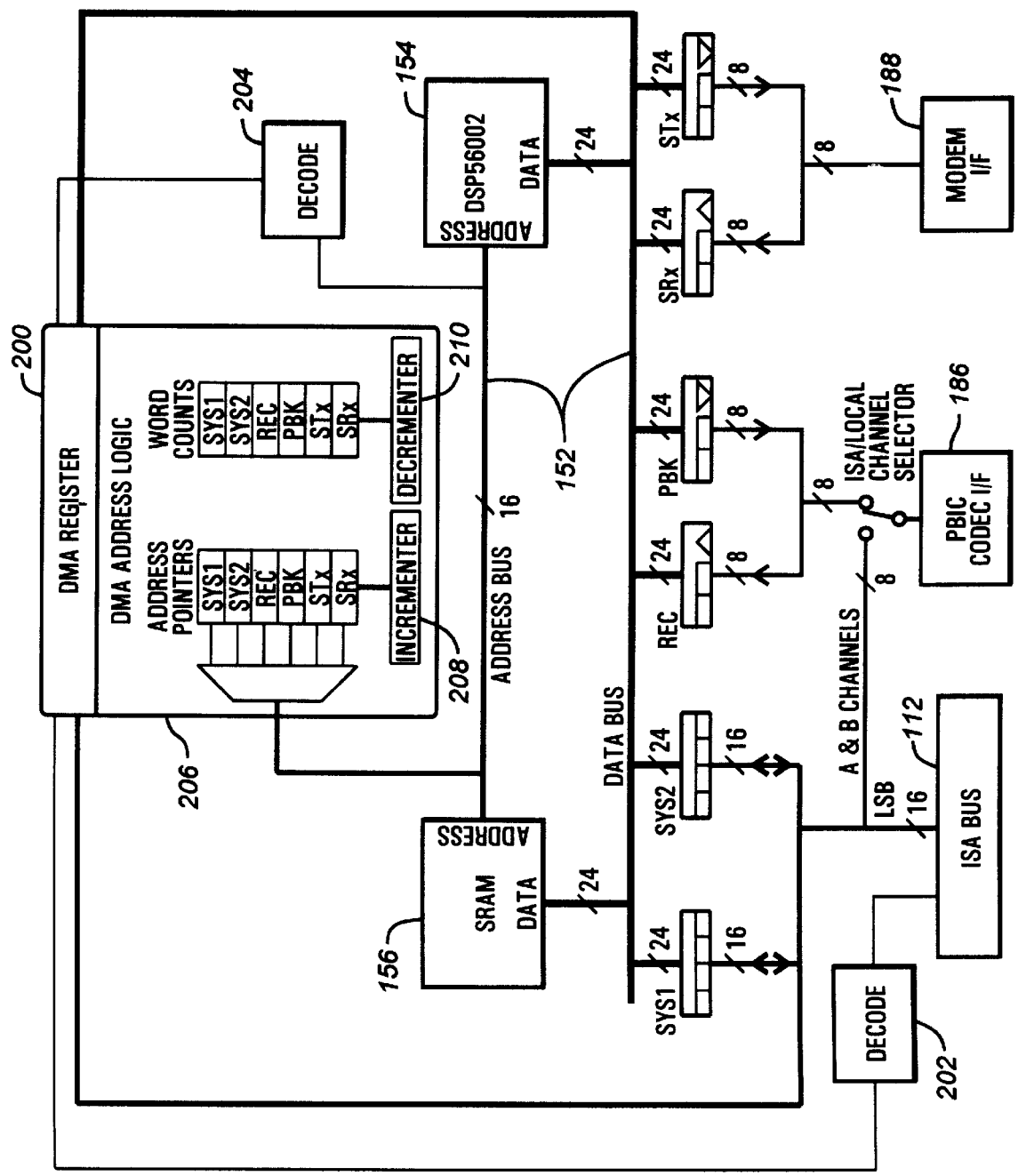
FIG. 4 is a block diagram between showing the logical connections according to the present invention.

Referring now to FIG. 4, a more detailed illustration of the DMA controller logic 182 is shown in conjunction with the various interfaces and the SRAM 156 and DSP 154. A number of DMA registers 200 are connected to the data portion of the ISA bus 112 and are selected by decode circuitry 202 connected to the ISA bus 112. To allow access by the DSP 154, the DMA registers 200 are also connected to the data bus portion of the DSP bus 152 and are selected by decode circuitry 204 which is connected to the address bus portion of the DSP bus 152. There is certain DMA addressing logic 206 contained in the DMA controller logic 182. Preferably there are six channels in the DMA controller logic 182, as will be described below. To this end, there are a series of address pointers and word counters contained in the address logic 206 along with an incrementer 208 and a decrementer 210 to allow the DMA controller logic 182 to properly transfer the desired number of data words and to provide the proper address to the SRAM 156. The output of the DMA address logic 206 is connected to the address bus portion of the DSP bus 152. The circuitry for transferring the various count values in the addressing logic 206 is conventional and not shown for clarity.

As noted, preferably there are 6 channels in the DMA controller logic 182. There are two channels SYS1 and SYS2 between the SRAM 156 and the ISA bus 112. Preferably SYS1 and SYS2 are bidirectional channels which can receive 16 bits from or provide 16 bits to the ISA bus 112 and work with the 24 bit data word on the DSP bus 152. A second pair of channels are related to the codec interface 186 and include a record or REC channel and a PBK or playback channel. Preferably these channels are unidirectional and adapted to operate with the 8 bit audio codec 160. The REC channel transfers information from the audio codec 160 to the DSP bus 152 and the SRAM 156 and the PBK channel transfers information from the SRAM 156 to the audio codec 160. The final two channels are the SRX and STX or serial receive and serial transmit channels which are again preferably unidirectional and operate with the 8 bit wide modem interface 188 which is connected to the daughterboard 166. The SRX channel transfers information from the modem interface 188 to the DSP bus 152, while the STX channel transfers information from the DSP bus 152 to the modem interface 188. Preferably each of the above described channels includes a series of multiplexors and latches to allow proper orientation and organization of data being transferred between the two connected devices. This multiplexor and latching circuitry and appropriate control circuitry is described in more detail below.

As noted above, each of the DMA channels has a given number of registers. In the case of the SYS1 and SYS2 channels, the registers consist of the channel control register, the status register, the base address register, the base count register, the current count register, the base bus count register, and the semaphore register. The channel control register is used to provide certain information, including whether 8, 16, 24 or 32 bit mode packing is utilized in the main memory 106 and the direction of the transfer. The status register provides certain information as to the status of the transfers, while the base address is the SRAM address utilized at the start of the next DMA transfer series. The base count register is the number of 24 bit words to be transferred on the DSP bus 152 and is loaded when the next transfer starts. The current count register is the number of remaining 24 bit DSP words. The base bus count register provides the number of 16 bit words to be transferred over the ISA bus 112. The value in the base count register is used to track and indicate completion of the DMA transfer, while the value in the base bus count register is used to provide an interrupt to the CPU 100 when it counts down to zero. Basically each channel proceeds according to available bus grants once started until the number of transfers indicated by the base count register is completed or the operation is otherwise terminated. The semaphore register is utilized to pass information between the DSP 154 and the host processor 100. The semaphore register preferably includes one byte of general purpose flag bits, a lock bit and an acquired bit. The operation of the lock and acquired bits are described below. It is noted that identical circuitry is provided for each of the SYS1 and SYS2 channels. Only one channel will be described for simplicity.

Figure 5:
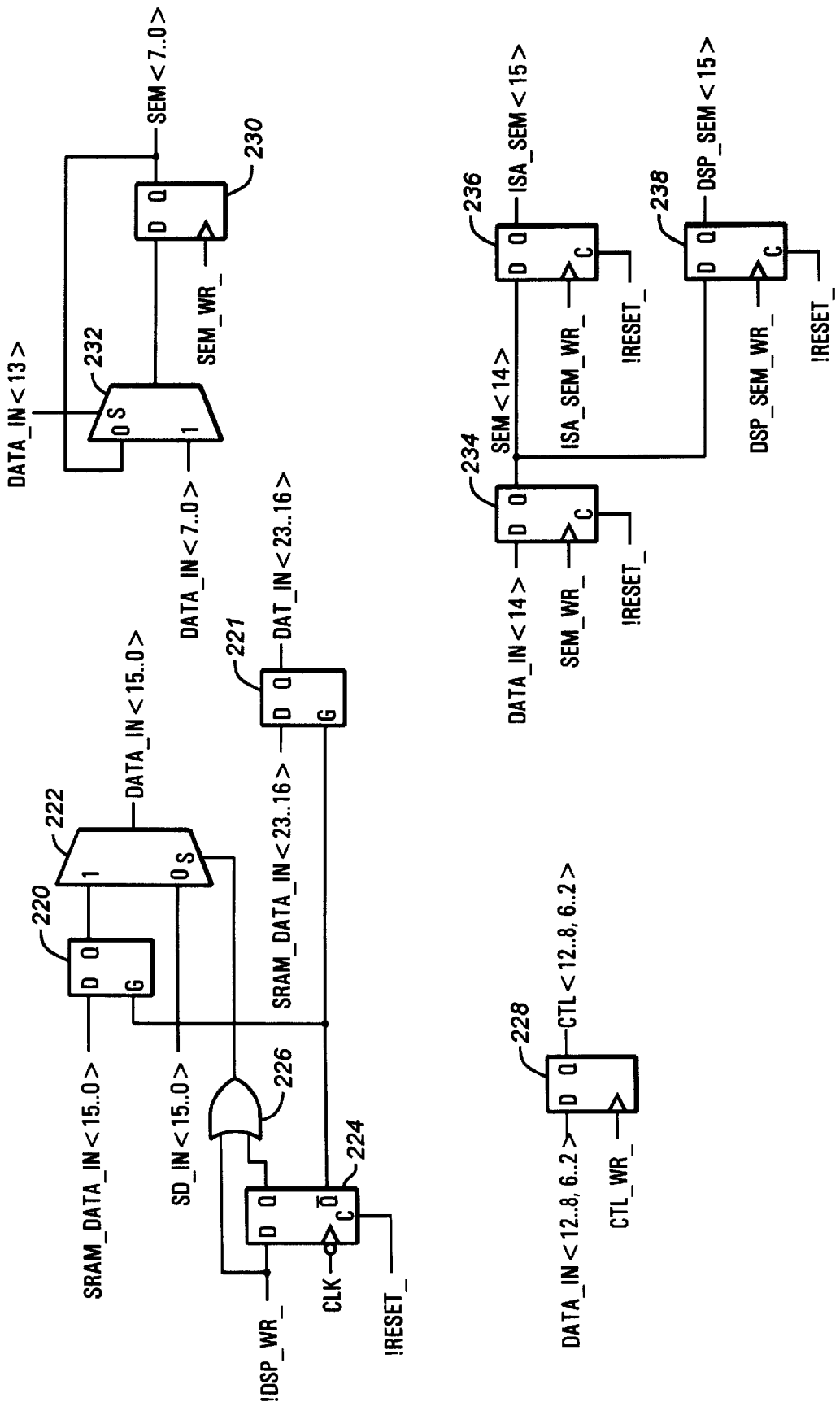
FIGS. 5 and 6 are schematic diagrams of various registers of the DMA controller of FIG. 4.

Referring now to FIG. 5, the input data channel selection and the channel control and semaphore registers are shown. An internal 24 bit data bus is utilized inside the interface ASIC 150 and is referred to as DATA_IN<23..0>. Signals referred to as SRAM_DATA_IN<23..16> are the D inputs of an 8 bit latch 221, whose non-inverted outputs provide the DATA_IN<23..16> signals. SRAM_DATA_IN<15..0> signals are provided to the D inputs of a 16 bit D-type latch 220. The non-inverted outputs of the latch 220 are provided to the one input of a 16 bit, two input multiplexor 222. The zero input is provided by the SD_IN<16..0> signals, which are provided from the ISA bus 112. The output of the multiplexor 222 is the DATA_IN<15..0> signals. The inverted version of a signal referred to as DSP_WR_ is provided the D input of a D-type flip-flop 224 and to one input of a two input OR gate 226. In this description a signal mnemonic ending in an underline is an active low signal and an exclamation point is utilized as an inversion symbol. The flip-flop 224 inverted clock input receives the CLK signal, which is the preferably the clock provided to the DSP 154. The non-inverted output of the flip-flop 224 is provided to the second input of the OR gate 226, whose output in turn is provided to the select input of the multiplexor 222. The inverted output of the flip-flop 224 is provided to the gate or enable input of the latch 220 and the latch 221.

Portions of the channel control register are formed by a 10 bit D-type flip-flop 228 whose D inputs are connected to the DATA_IN<12..8,6..2> signals. The clocking signal for the flip-flop 228 is provided by a CTL_WR_ signal as will be described below. The non-inverted outputs of the flip-flop 228 are the CTL<12..8,6..2> signals to form those respective channel control register outputs. The lower byte of the semaphore register is developed by the outputs of an 8 bit D-type flip-flop 230 which is clocked by an SEM_WR_ signal. The inputs to the flip-flop 230 are provided by the output of an 8 bit, two input multiplexor 232 with the 1 input receiving the DATA_IN<7..0> signals and the 0 input receiving the non-inverted outputs of the flip-flop 230, which are the SEM<7..0> signals, these being the flag bits. The select input to the multiplexor 232 is provided by the DATA_IN<13> signal, so that if the bit is not set, no changes are made to the flag bits.

Bit position 14 of the semaphore register is the lock bit, while bit position 15 is the acquired bit. The DATA_IN<14> signal is provided to the D input of a D-type flip-flop 234 which is clocked by the SEM_WR_ signal. The non-inverted output of the flip-flop 234 is the SEM<14> signal that is the lock bit and is provided to the D inputs of D-type flip-flops 236 and 238. The flip-flop 236 is clocked by the ISA_SEM_WR_ signal and the non-inverted output is the ISA_SEM<15> signal. That is the ACQ or acquired signal provided to the ISA bus 112. The flip-flop 238 is clocked by the DSP_SEM_WR_ signal and its non-inverted output provides the DSP_SEM<15> signal, that is, the ACQ or acquired signal provided to the DSP 154. In this manner, when a particular processor writes to the semaphore register, the prior state of the LOCK bit is transferred to the writing device acquisition bit so that upon reading the semaphore register, the writing device is able to see if it was able to successfully obtain control of the DMA channel as indicated by the LOCK and ACQ bits in the semaphore register.

The base address register is developed by a 16 bit D type latch 240 which receives at its D inputs the DATA_

IN<15..0> signals and provides at its non-inverting outputs the BASE_ADD<15..0> signals. The latch 240 is gated by the !BASE_ADD_WR_ signal. The base count register is developed by a 16 bit D-type latch 242 which receives at its D inputs the DATA_IN<15..0> signals and provides at its non-inverted output the BASE_CNT<15..0> signals. The latch 242 is gated by the !BASE_CNT_WR_ signal. The base bus count register is developed by a 16 bit flip-flop 244 which receives at its D inputs the DATA_IN<15..0> signals and provides as its output the ISA_CNT<15..0> signals. The flip-flop 244 is clocked by the ISA_CNT_WR_ signal. These are exemplary registers in the SYS1 and SYS2 channels and provided for explanatory purposes. It is understood that both channels contain identical circuitry.

Figure 8:
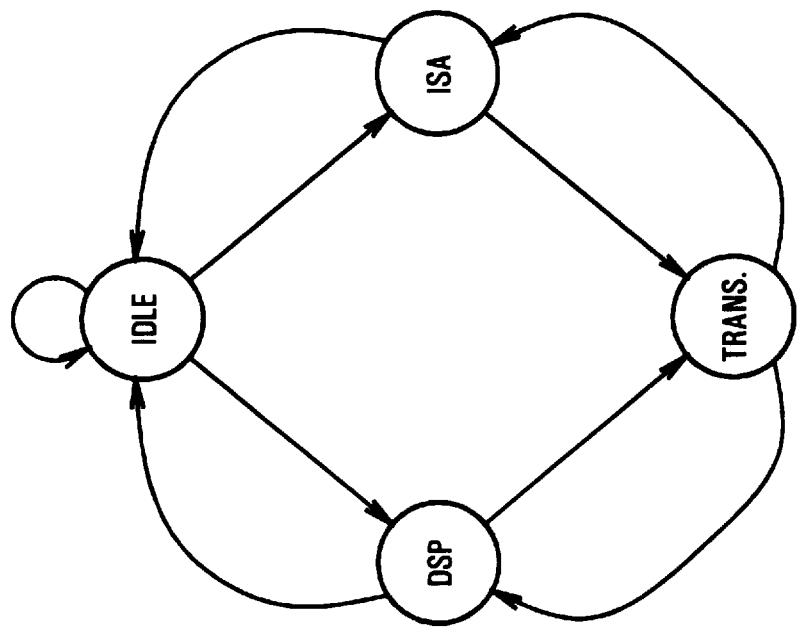
FIG. 8 is an illustration of a state machine used with the circuitry of FIG. 7.
Figure 6:
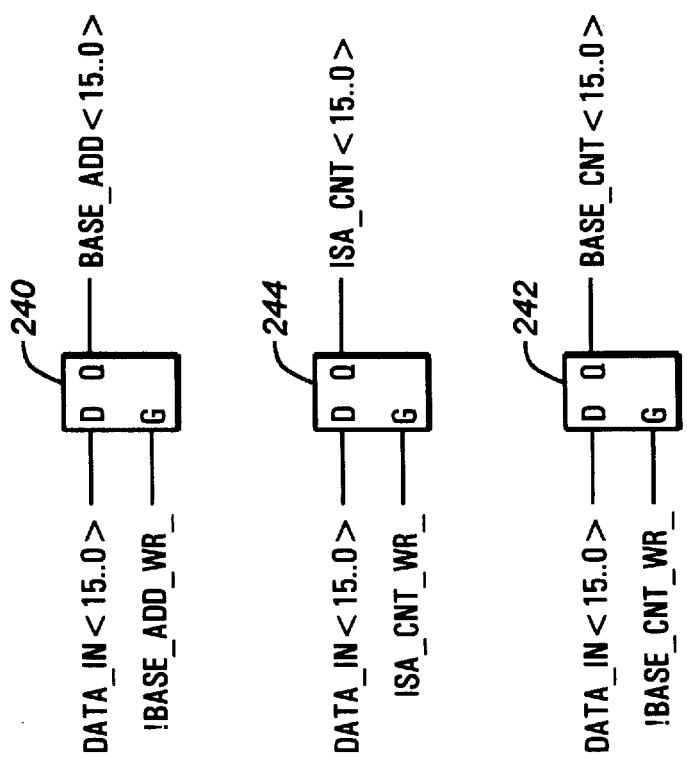
Figure 7:
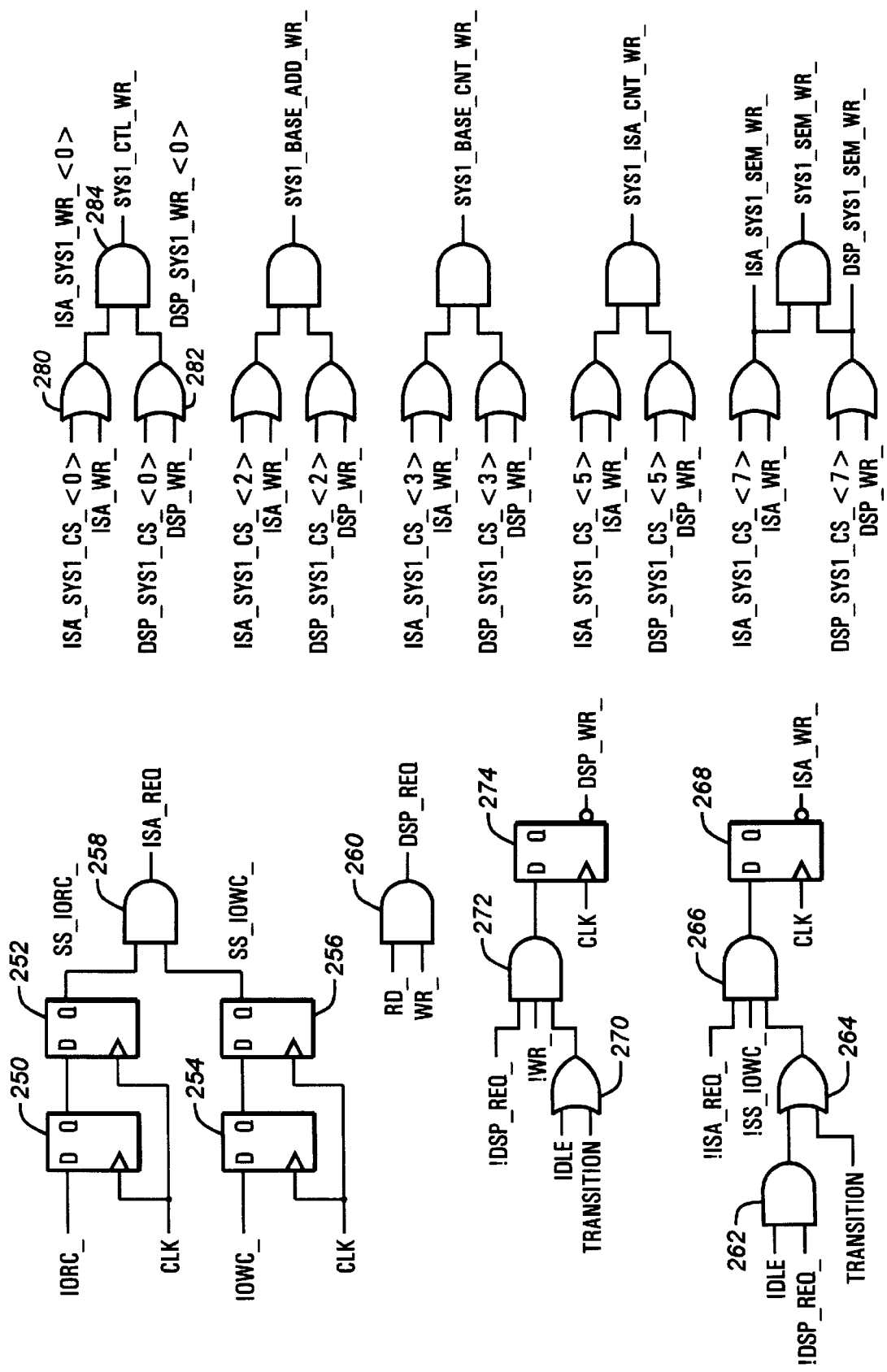
FIG. 7 is a schematic diagram of control circuitry associated with the registers of FIGS. 5 and 6.

As noted in the discussion of the various flip-flops and latches forming the registers, various control pulses are utilized to develop the clocking or gating inputs. Development of these flip-flops is shown in FIGS. 7 and 8. Referring to FIG. 7, the IORC_ signal provided from the ISA bus 112 to indicate that an I/O read operation is occurring is provided to the D input of a D-type flip-flop 250, with the flip-flop 250 being clocked by the CLK signal. The non-inverted output of the flip-flop 250 is provided to the D input of a D-type flip-flop 252 which is also clocked by the CLK signal. The non-inverted output of the flip-flop 252 is the SS_IORC_ or doubly synchronized IORC_ signal. Similarly, the IOWC_ signal is provided to flip-flops 254 and 256 to produce the SS_IOWC_ signal. The SS_IORC and SS_IOWC signals are provided as the two inputs to a two input AND gate 258, whose output is the ISA_REQ_ or ISA request signal. The WR_ and RD_ or write and read signals from the DSP 154 are provided to the two inputs of a two input AND gate 260, whose output is the DSP_REQ_ signal to indicate a DSP request.

The state machine of FIG. 8 is used to control access to the multiply accessible registers to ensure that two devices do not write at the same time. The state machine starts out at an IDLE state and proceeds to a DSP state if the DSP_REQ signal is asserted. If the ISA_REQ signal is asserted, indicating an ISA request and the DSP_REQ signal is not asserted, control proceeds to the ISA state. If neither request signal is asserted, control remains at the IDLE state. Control proceeds from the DSP state to a TRANSITION state if an ISA request is present and otherwise returns to the IDLE state. Control proceeds from the ISA state to the TRANSITION state if the DSP request is present and otherwise returns to the idle state. Control proceeds from the TRANSITION state to the ISA state if an ISA request is present and otherwise proceeds to the DSP state. The state machine is clocked on the CLK signal. As can be seen, there is always at least one state, either IDLE or TRANSITION, between the entry into the DSP or ISA states. This is to allow some minimal time between transfers for data source switching.

Two master write strobes referred to as the DSP_WR_ and ISA_WR_ signals are utilized to properly time the write strobes to the various registers. These are based on the presence of requests and on the state of the state machine. A signal indicating that the state machine is in the IDLE state is provided as one input to a two input AND gate 262 with the DSP_REQ_ signal provided as the second input. The output of the AND gate 262 is one input to a two input OR gate 264 with the other input being the TRANSITION state indication. The output of the OR gate 264 is one input to a three input AND gate 266, with the other two inputs being the !ISA_REQ_ signal and the !SS_IOWC_ signal. The output of the AND gate 266 is provided to the D input of a D-type flip-flop 268 which is clocked by the CLK signal. The inverted output of the flip-flop 268 is the ISA_WR_ signal. Therefore, a simple single clock pulse is provided on the ISA_WR_ signal.

The signals indicating the IDLE and TRANSITION states are provided as the two inputs to a two input OR gate 270 whose output is provided as one input to a three input AND gate 272. The other two inputs to the AND gate 272 are the !DSP_REQ_ signal and the !WR_ signal. The output of the AND gate 272 is provided to the D input of a D-type flip-flop 274 which is clocked by the CLK signal. The inverted output of the flip-flop 274 is the DSP_WR_ signal, the master DSP write strobe.

A signal referred to as ISA_SYS1_CS_<0>, indicating the addressing of the control port in the SYS1 DMA channel over the ISA bus 112, is provided as one input to a two input OR gate 280. The second input to the OR gate 280 is the ISA_WR_ signal. A signal referred to as DSP_SYS1_CS_<0>, indicating a request for the similar register by the DSP 154 is provided as one input to a two input OR gate 282 with the other input receiving the DSP_WR_ signal. The outputs of the OR gates 280 and 282 are provided as the inputs to a two input AND gate 284 whose output is a SYS1_CTL_WR signal, which is the signal provided to the flip-flop 228 to strobe the control register data. The decoding has been shown for the SYS1 register and it is noted that similar decoding is provided for the SYS2 register. Similar logic is utilized to form the SYS1_BASE_ADDR_WR_, SYS1_BASE_CNT_WR_, and SYS1_ISA_CNT_WR_ signals. It is also noted that similar circuitry is provided to developed the SYS1_SEM_WR signal or semaphore strobe, but it is further noted that the two inputs to the final AND gate form the ISA_SEM_WR_ and DSP_SEM_WR_ signals provided to the flip-flops 236 and 238.

Therefore it can be seen that both the CPU 100 and the DSP 154 can readily write data to the various registers in the SYS1 and SYS2 DMA channels. This allows both of them to control operation of the DMA channels.

Figure 9:
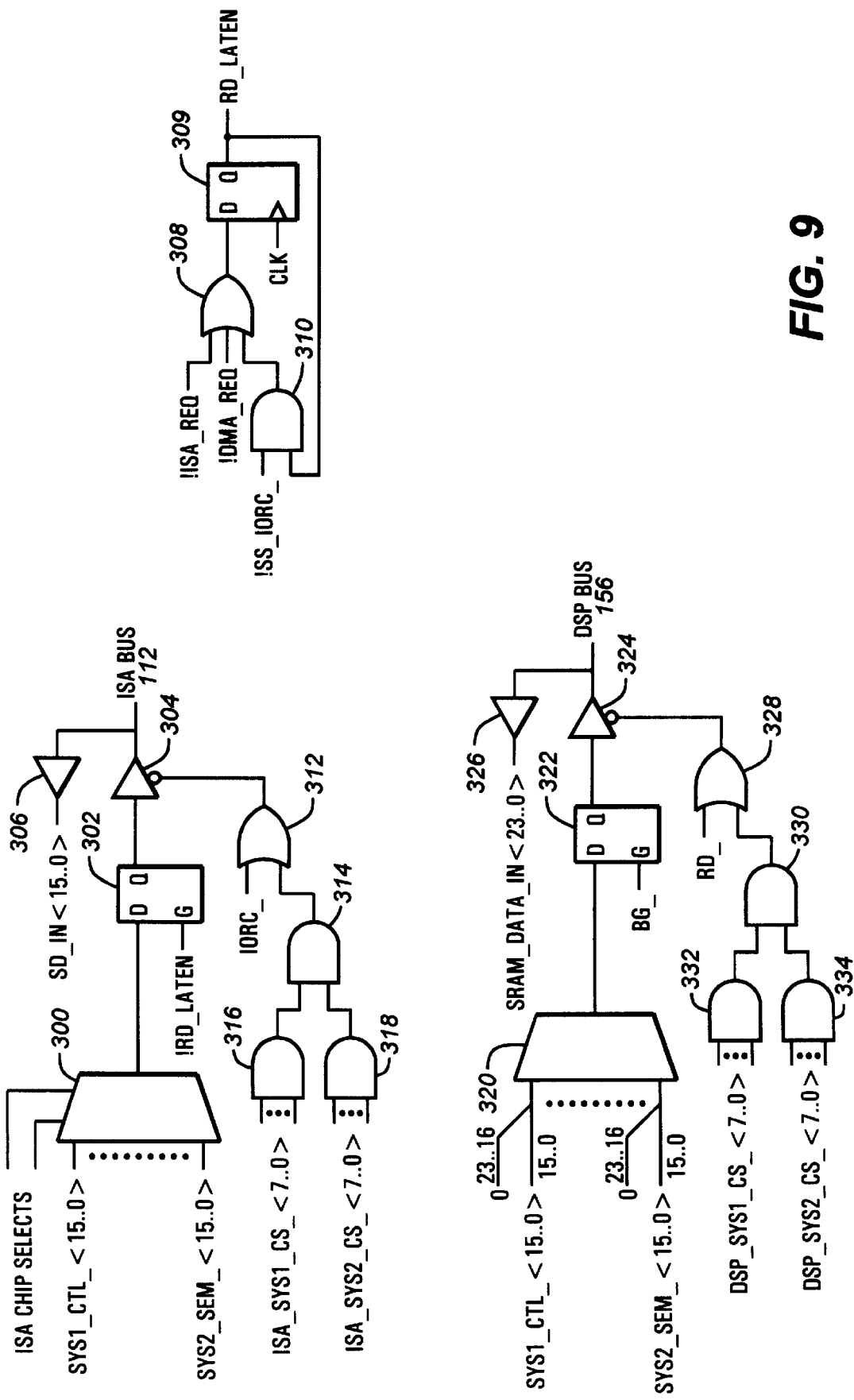
FIG. 9 is a schematic diagram of data input and output circuitry associated with the registers of FIGS. 5 and 6.

Referring now to FIG. 9, the circuitry used to read the various registers is illustrated. The outputs of the various channel registers are provided to inputs of a multiplexor 300, with the various ISA chip select signals as discussed above being provided to the multiplexor 300 to select the particular register outputs. The output of the multiplexer 300 is provided to a 16 bit D-type latch 302 with the non-inverted outputs of the latch 302 provided as inputs to a 16 bit tristate buffer 304. The output of the tristate buffer 304 is connected to the data portions of the ISA bus 112. A 16 bit buffer 306 has its inputs connected to the ISA bus 112 and its outputs provide the SD_IN<15..0> signals. The gate or enable signal for the latch 302 is provided at the output of a three input OR gate 308. One input to the OR gate 308 is the !ISA_REQ_ signal, while a second input is the !DMA_REQ_ signal. A third input to the OR gate 308 is provided by the output of a two input AND gate 310 which receives the !SS_IORC_ signal at one input. The output of the OR gate 308 is provided to the D input of a D-type flip-flop 309, which is clocked by the CLK signal. The non-inverted output of the flip-flop 309 is the RD_LATEN signal and is provided to the second input of the AND gate 310. Thus the data is latched upon the beginning of an ISA or DMA read cycle and is stable throughout the portion of the read cycle. The inverted tristate control input of the buffer 304 is provided by the output of a two input OR gate 312, one of whose inputs is the IORC_signal and whose other input is provided by the output of a two input AND gate 314. One input to the AND gate 314 is provided by the output of an 8 bit AND gate 316 which receives at its inputs the 8 chip select signals for the SYS1 channel registers. The second input to the AND gate 314 is provided by the output of an 8 bit AND gate 318 whose inputs are the 8 chip select signals for the SYS2 channel registers. Thus, if any chip selects are present for any of the SYS1 or SYS2 channel registers, the output of the AND gate 314 is low, so that when the IORC_ signal is low, the buffer 304 is activated to provide the data to the ISA bus 112.

A multiplexor 320 is utilized to provide data to the DSP 154. The inputs to the multiplexor 320 are the 16 bits of the particular SYS1 and SYS2 registers with 8 bits of zero value appended as the most significant byte. The selection of the particular input of the multiplexor 320 is provided by the DSP chip selects in a manner similar to that of the multiplexer 300. The output of the multiplexor 320 is provided to a 24 bit D-type latch 322 which has its non-inverting outputs connected to the inputs of a 24 bit tristate buffer 324. The outputs of the buffers 324 are connected to the data portion of the DSP bus 152. The data portion of the DSP bus 152 is also connected to the inputs of a 24 bit buffer 326, whose outputs are the SRAM_DATA_IN<23..0> signals. The gate signal to the latch 322 is the BG_ signal or bus grant signal, indicating that the interface ASIC 150 has been granted access and control of the DSP bus 152. Arbitration for this bus is not shown, but can be readily developed by one skilled in the art. The inverted tristate enable input of the buffer 324 is provided by the output of a two input OR gate 328, one of whose inputs is the RD_ signal and whose other input is provided by the output of a two input AND gate 330. One input to the AND gate 330 is provided by the output of an eight input AND gate 332 which receives the DSP SYS1 chip select signals. The second input to the AND gate 330 is provided by the output of an eight input AND gate 334 which receives at its inputs the eight chip select signals for the DSP.

Figure 10A:
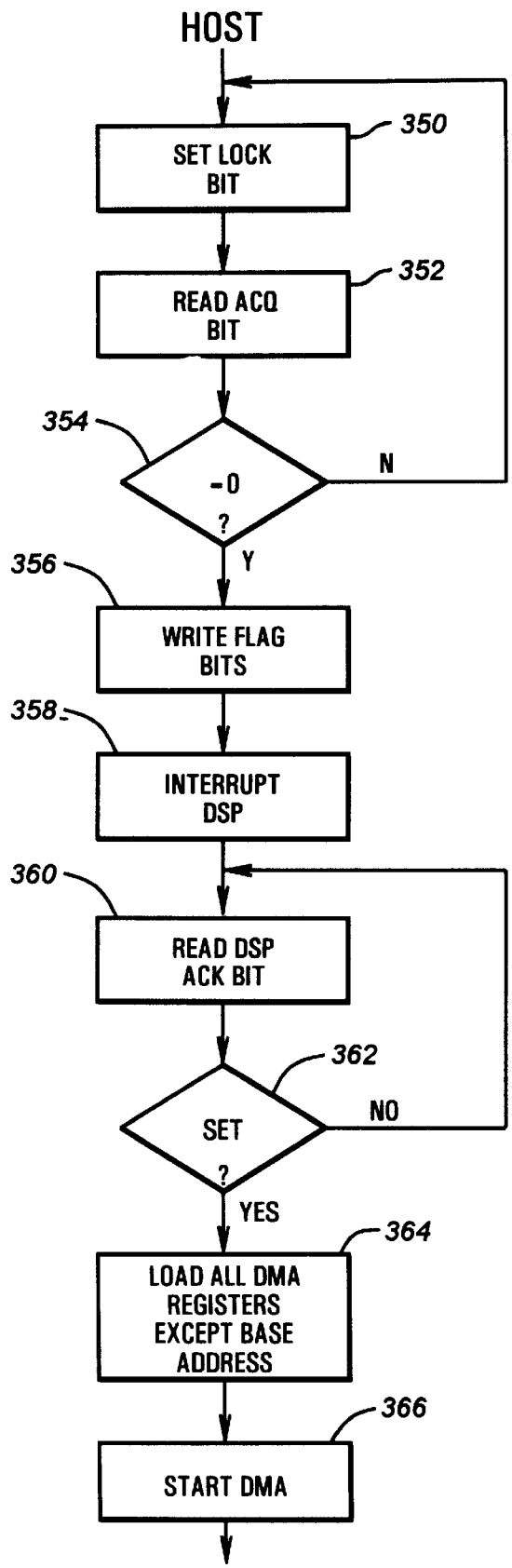
FIGS. 10A, 10B and 10C are flowcharts of one embodiment of operations of the host and local processors according to the present invention.
Figure 10B:
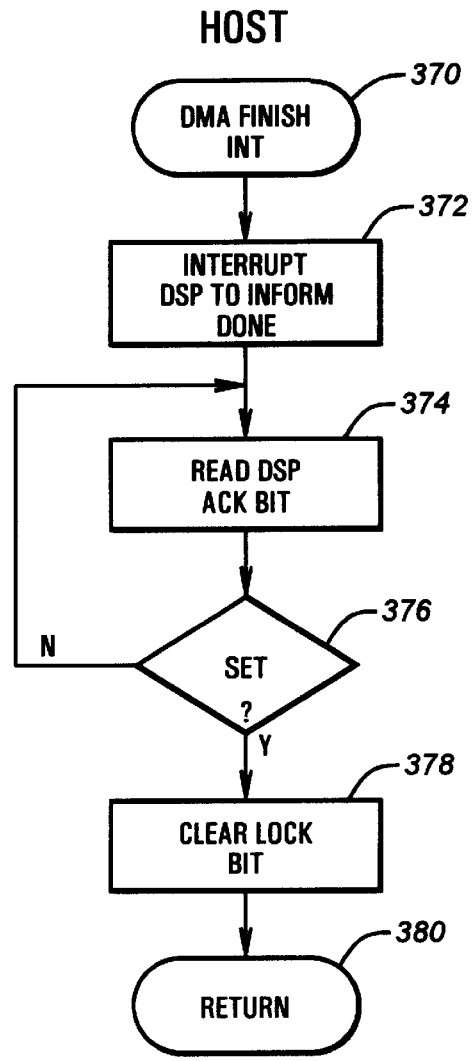
Figure 10C:
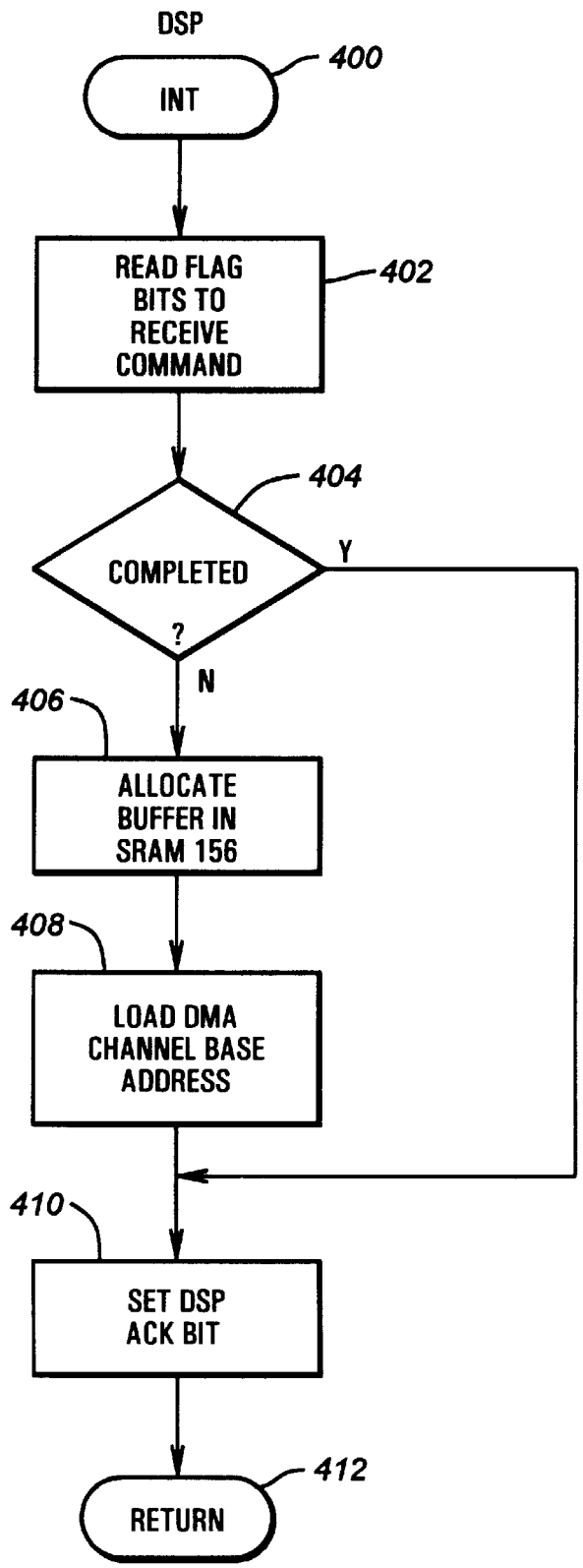

The DSP 154 and the host CPU 100 cooperate to determine control of the SYS1 and SYS2 channels. This is done using the semaphore flags and the LOCK and ACQ bits in the semaphore register. Exemplary operations are shown in FIGS. 10A, 10B and 10C. Referring to FIG. 10A, the host CPU 100 determines that it desires control of the DMA channel. The host CPU 100 addresses the desired semaphore channel and writes a value to set the LOCK bit in step 350. The host CPU 100 then reads the semaphore register in step 352 to determine the state of the acquired or ACQ bit. In step 354 the host CPU 100 determines if the ACQ bit is a 0 state. If not, this is an indication that the DMA channel is already locked by the DSP 154, so control returns to state 350 where the host CPU 100 again tries to set the LOCK bit. Ultimately, the DSP 154 will have unlocked the DMA channel so that the LOCK bit at sometime will be 0 and ultimately at the time after this time, when the host CPU 100 sets the LOCK bit, the ACQ bit will read as a 0. When this occurs, step 354 will cause control to proceed to step 356, where the host CPU 100 writes the particular flag bits desired for communication with the DSP 154 to the flag portion of the semaphore register. Control then proceeds to step 358, where the host CPU 100 writes to the DSP register interface 190 to cause an interrupt to occur to the DSP 154. Control then proceeds to step 360, where the host CPU 100 reads the semaphore register to determine if the DSP 154 has set an ACK bit present in the flags. Control proceeds to step 362 to determine if the ACK bit has been set. If not, control returns to step 360. If the bit has been set, control proceeds to step 364, where the host CPU 100 loads all of the DMA channel registers except for the base address register. Control then proceeds to step 366, where the host CPU 100 writes to the appropriate register to start the DMA channel operation. The host CPU 100 then goes on to other activities.

When the DMA transfer operation is completed, the DMA logic 152 provides an interrupt to the host CPU 100. This causes the host CPU 100 to initiate the DMA finished interrupt sequence 370 (FIG. 10B) which commences at step 372 where the host CPU 100 interrupts the DSP 154 to indicate that the DMA transfer has completed. Control proceeds to step 374 to read the flag bits in the semaphore register to determine that the DSP 154 has acknowledged the completion. Control proceeds to step 376 to determine if the ACK bit has been set. If not, control returns to step 374. If so, control proceeds to step 378, where the host CPU 100 clears the LOCK bit in the semaphore register and then returns from the interrupt sequence in step 380.

Referring to FIG. 10C, the exemplary DSP operations are shown. An interrupt sequence 400 is executed upon the interruption of the DSP 154 by the host CPU 100. Control proceeds to step 402, where the DSP 154 reads the flag bits of the particular semaphore register to receive the command information from the CPU 100. Control then proceeds to step 404 to determine if the flag bits indicate that an operation has completed. If not, control proceeds to step 406 where the DSP 154 allocates buffer space in the SRAM 156 so that there is a clear memory space for transfer of the data. Control then proceeds to step 408, where the DSP 154 loads the DMA channel base address register with the appropriate value to point to the beginning of the buffer space in the SRAM 156. Control then proceeds to step 410, which is also where control proceeds if there was a completion indication in step 404. In step 410, the DSP 154 sets the ACK bit in the flag bits of the semaphore register to indicate that it has completed the necessary operations. Control then proceeds to step 412 where the DSP returns from the interrupt. Therefore it can be seen that with the use of the semaphore register, the two devices are able to properly share the DMA channels which can be controlled by either source.

This has been only one example of coordination between the DSP 154 and host CPU 100 in the use of the SYS1 and SYS2 channels. Other methods are possible and can be readily developed by one skilled in the art.

It can thus be seen that both the host CPU 100 and the local DSP 154 can control the DMA channel between the two devices. To perform a complete transfer the host CPU 100 has also properly programmed the host DMA controller in the system peripheral 114. Once the DMA channel in the DMA controller logic 182 is programmed, it can be started and the data transfer between the SRAM 156 and the main memory 106 occurs without intervention by either the host CPU 100 or the DSP 154. The DMA controller logic 182 properly provides the DREQ signal to the ISA bus 112 when data is to be transferred and the system peripheral provides the DACK signal to indicate control has been granted. The two DMA controllers proceed with this handshaking until the programmed transfer is completed. The local DMA controller logic 182 is similarly requesting and receiving control of the DSP bus 152 when transferring data. This process improves data transfer by removing the processors from the direct activity, allowing them to concentrate on control functions and not simple data transfer operations. By allowing each processor to independently program its information into the DMA controller logic 182, message passing is reduced. Therefore overall system performance is improved for several reasons.

As previously discussed, there are various possibilities for transferring data between both the ISA bus 112 and the SRAM 156 and the audio codec 160 and the daughterboard 166 and the SRAM 156. Particularly, transfers between the ISA bus 112 and the SRAM 156 can be conducted in what are referred to as 8, 16, 24 and 32 bit modes, while transfers between the codec 186 and the modem interface 188 and the SRAM 156 can be conducted in 8, 16 and 24 bit modes. These modes refer to the various data arrangements of the host computer system S and the audio/modem card 118. FIGS. 11A–11G illustrate the operation in the various modes. As can be seen, in certain of the modes multiple numbers of operations are required on the respective buses. For example, in the SYS1 and SYS2 24 bit mode, three ISA bus 112 operations and two DSP bus 152 operations are required. In other modes such as the SYS1 and SYS2 16 bit mode and the device 8 bit mode only a single transfer operation is required on each bus. Further, it is noted that in certain modes data is switched between bytes and in certain modes less than all the data is being transferred, so that zero values are properly provided to fill or pad the varying bytes not otherwise containing valid data. For example, in SYS1 and SYS2 8 bit mode the two least significant bytes of the DSP data are zero padded during the transfer operations so that the actual data values are in most significant byte to remove noise values. Similarly the zero values or padded bytes are located in the other modes as required. In the SYS1 and SYS2 32 bit mode for transfers from the SRAM 156 to the ISA bus 112, it is noted that the most significant byte is filed with zeroes as the CPU 100 is operating in a different mode. Therefore it is necessary to include certain counting, latching and byte shifting operations to perform the required transfers. The details are provided below.

Figure 12:
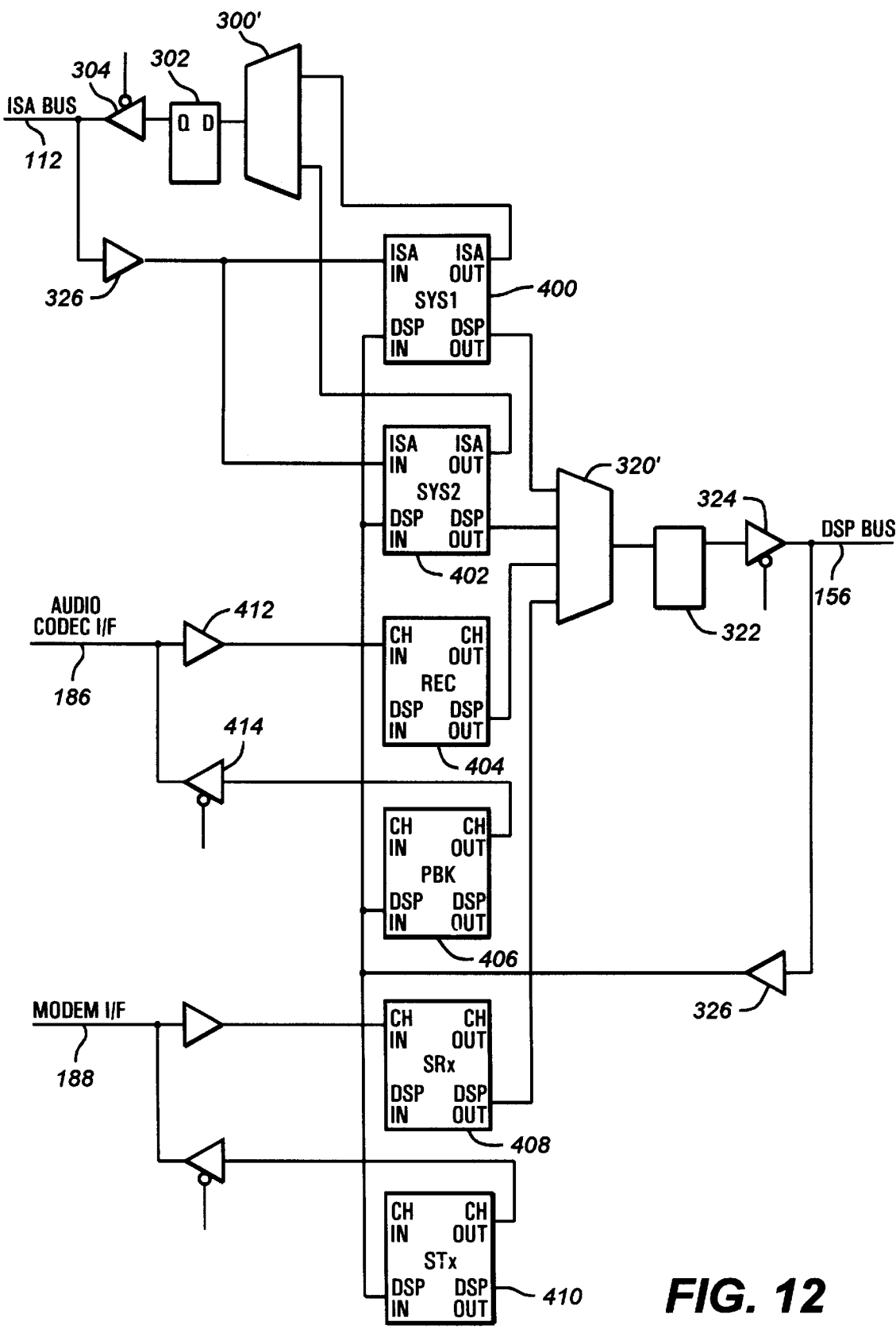
FIG. 12 is a detailed block diagram illustrating the transfer channels in the interface ASIC of FIG. 2.

FIG. 4 logically shows the various data transfer channels, but further details are provided in FIG. 12. The SYS1 and SYS2 channels 400 and 402 are identical in construction as are the REC, PBK, SRX and STX channels 404, 406, 408 and 410. Each of the modules 400–410 has two inputs and two outputs. In the case of the SYS1 and SYS2 channels 400 and 402 the inputs are from the ISA bus 112 and the DSP bus 152 and the outputs are to the similar buses. In the case of the REC, PBK, SRX and STX channels 404–410 the inputs are from the respective channel inputs and the DSP bus 152 and outputs are to the channel outputs and to the DSP bus 152. In the cases of the REC and SRX channels only the channel in and DSP out connections are connected, while for the PBK and STX channels 406 and 410 only the channel out and DSP in connections are connected.

The ISA outputs of the SYS1 and SYS2 channels 400 and 402 are inputs to a multiplexer 300', which is effectively the multiplexor 300. In FIG. 9 the multiplexor 300 was shown in a simplified format, showing only inputs from the specific control registers. In the preferred embodiment the multiplexor actually receives inputs from any source which can provide data to the ISA bus 112. This is the multiplexor 300' and it includes all the necessary inputs. The ISA inputs to the SYS1 and SYS2 channels 400 and 402 are provided from the buffers 306. The DSP outputs of the SYS1 and SYS2 channels 400 and 402 are provided to inputs to a multiplexor 320'. The multiplexor 320', in a fashion similar to that of the multiplexor 300', includes inputs for all of the sources of data to the DSP bus 152, whereas the multiplexor 320 was illustrated as only showing the particular registers of interest in FIG. 9. The DSP inputs to the SYS1 and SYS2 channels are provided from the buffer 326. It is noted that the output enable inputs of the buffers 304 and 324 to the ISA bus 112 and to the DSP bus 152 have additional terms as compared to those shown in FIG. 9 in that the AND gate tree is significantly larger to include all necessary chip selects and DMA selects.

The channel input for the REC channel 404 is provided by an 8 bit buffer 412 which receives at its inputs the 8 bit data portion of the codec interface 186. The DSP bus output of the REC channel 404 is connected as a further input to the multiplexor 320'. The PBK channel 406 channel data output is provided to the inputs of an 8 bit tristate buffer 414, which has its outputs connected to the data portion of the codec interface 186. The tristate output is activated at a proper time for the audio codec 160 to receive the information. The DSP bus input of the PBK channel 406 is connected to the output of the tristate buffer 326 to receive the DSP data. In a similar fashion the SRX channel 408 and the STX channel 410 are connected to the modem interface 188 and to the DSP bus 152.

Figure 13A:
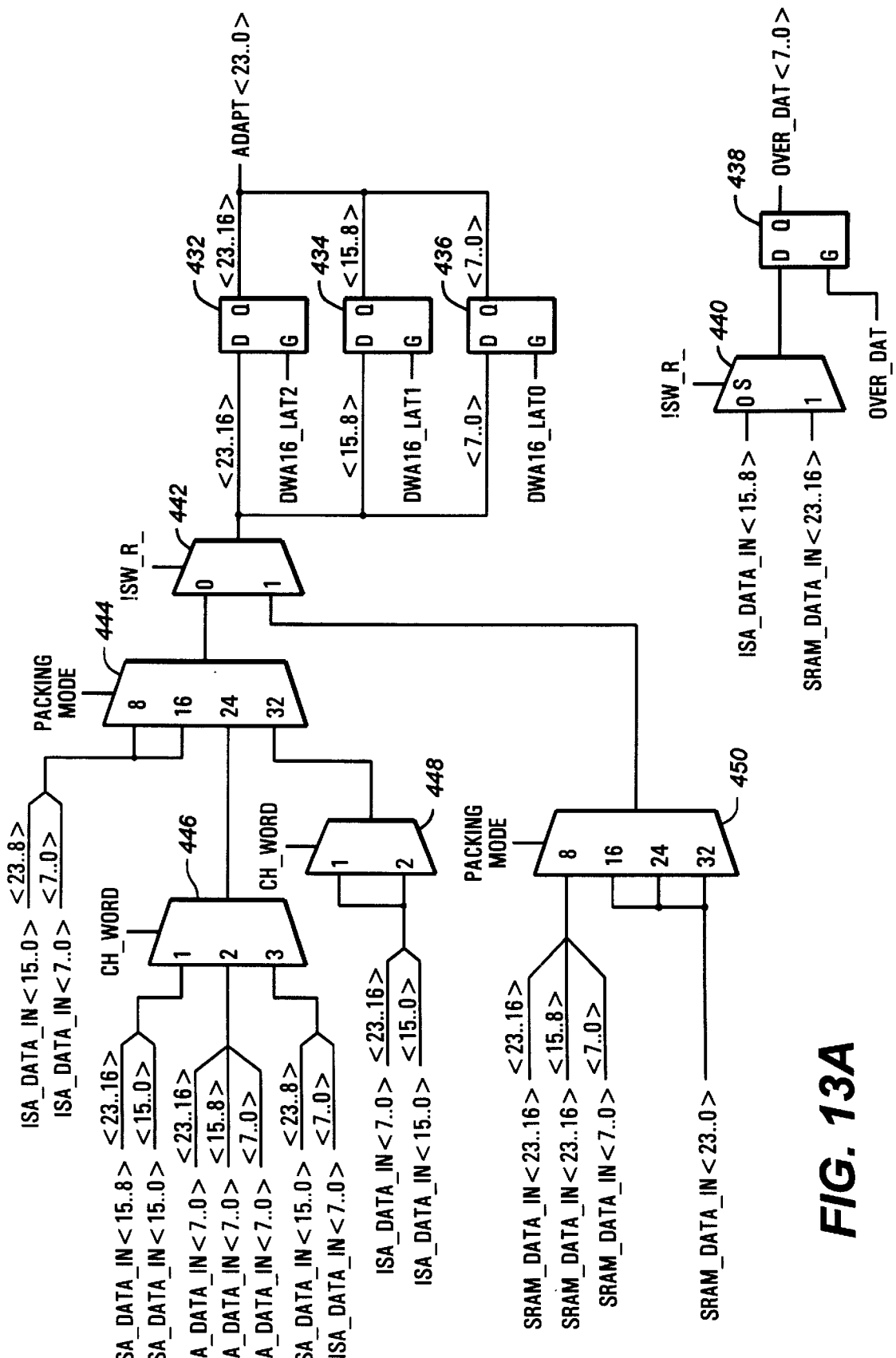
FIGS. 13A, 13B and 13C are schematic diagrams of the data realignment and padding circuitry of two of the channels of FIG. 12.
Figure 13B:
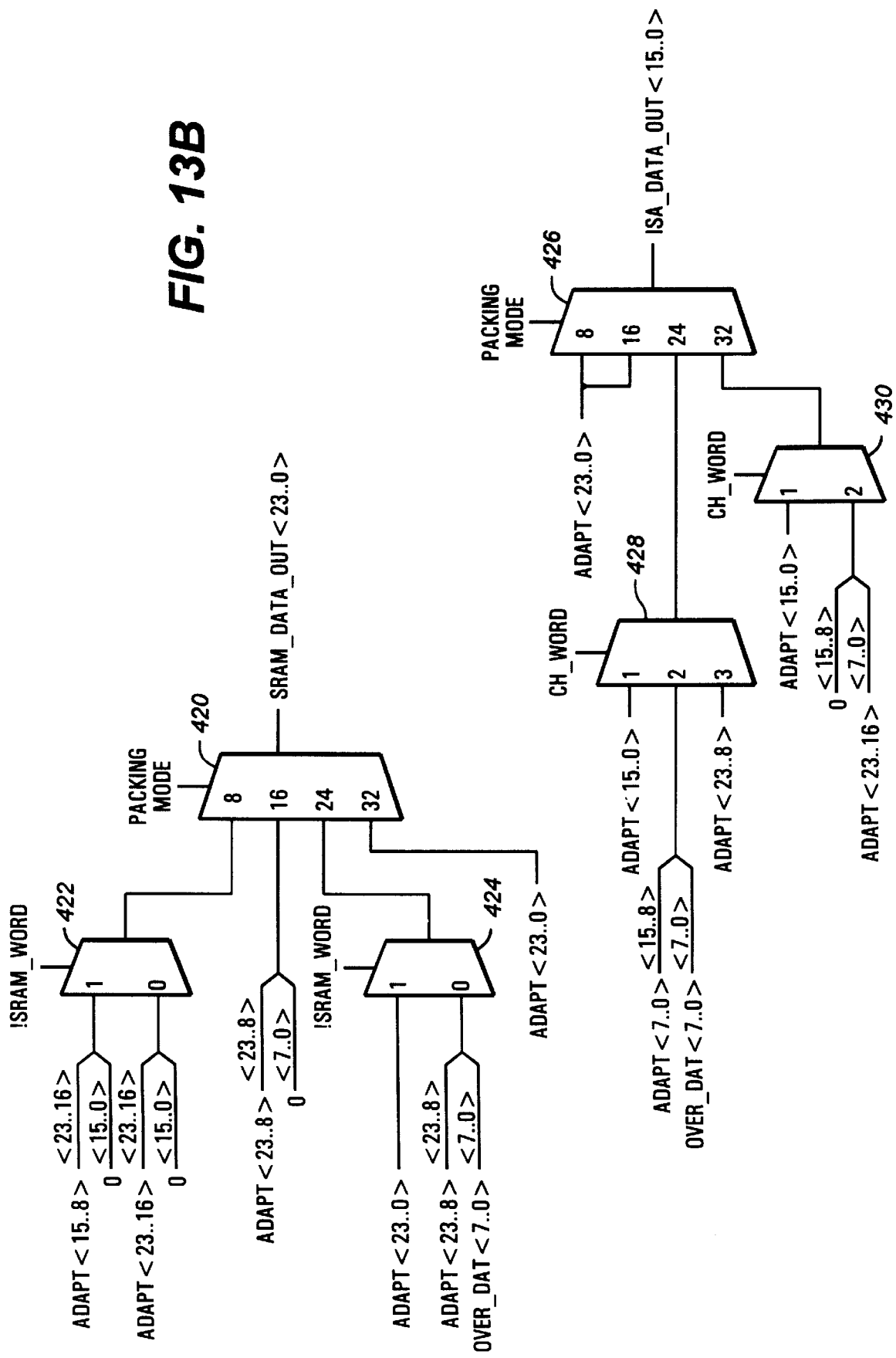
Figure 13C:
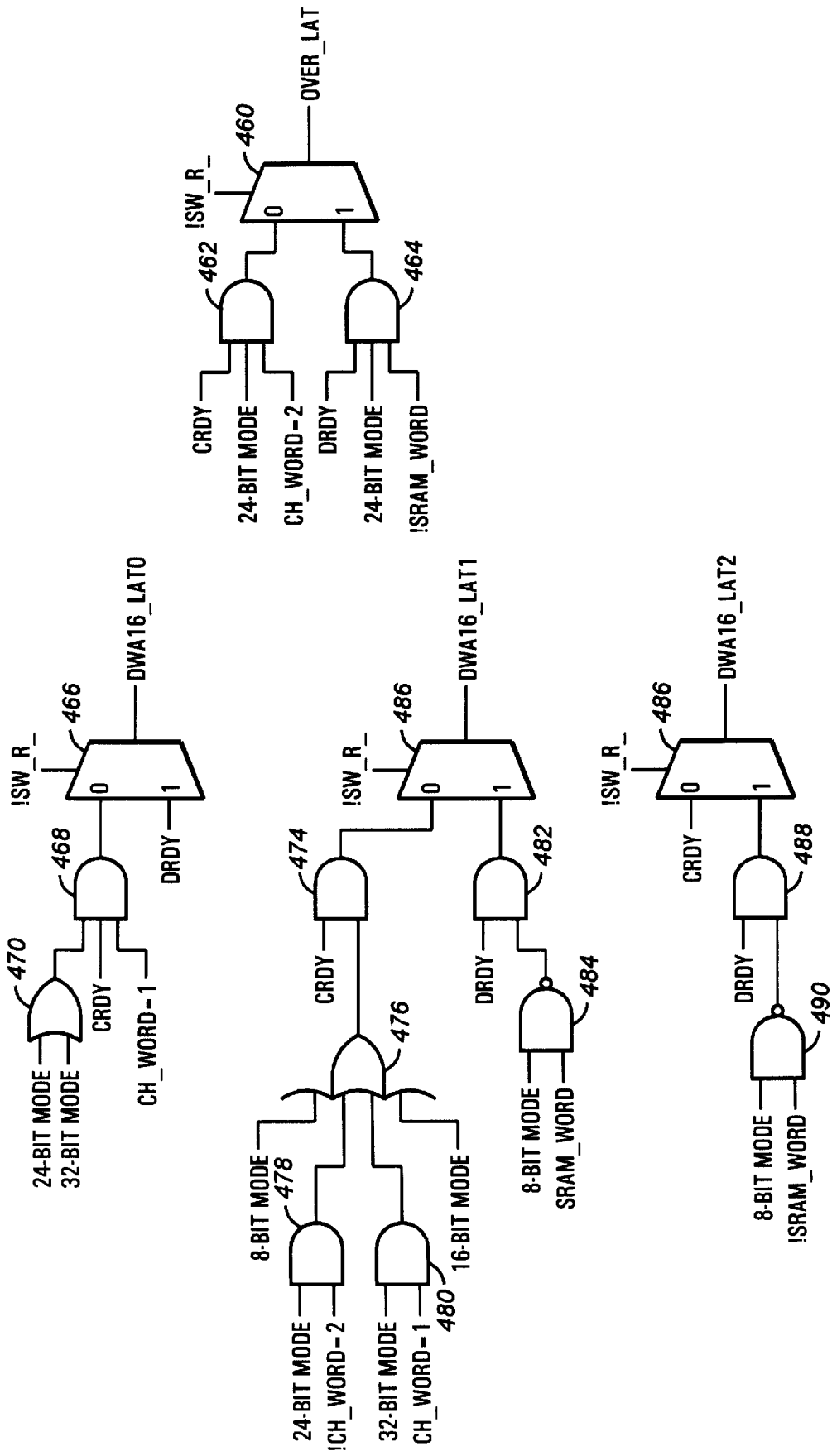
Figure 14A:
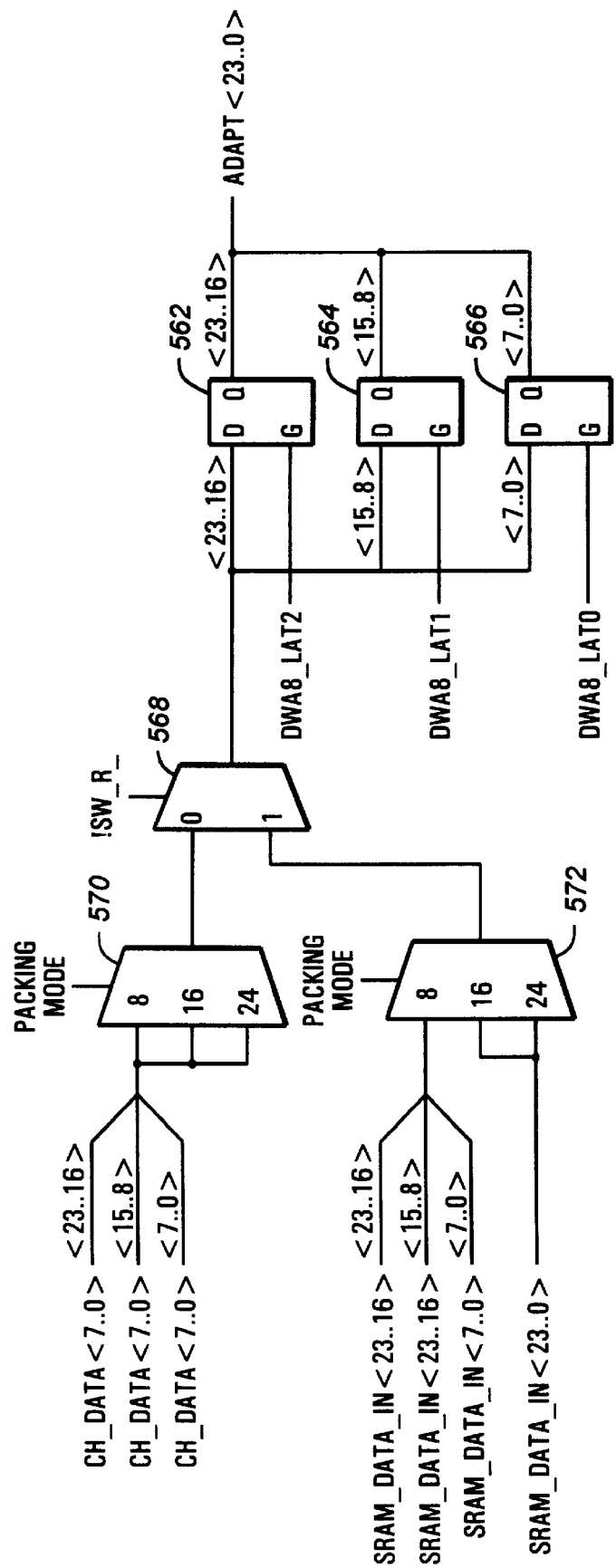
FIGS. 14A, 14B and 14C are schematic diagrams of the data realignment and padding circuitry of four of the channels of FIG. 12.
Figure 14B:
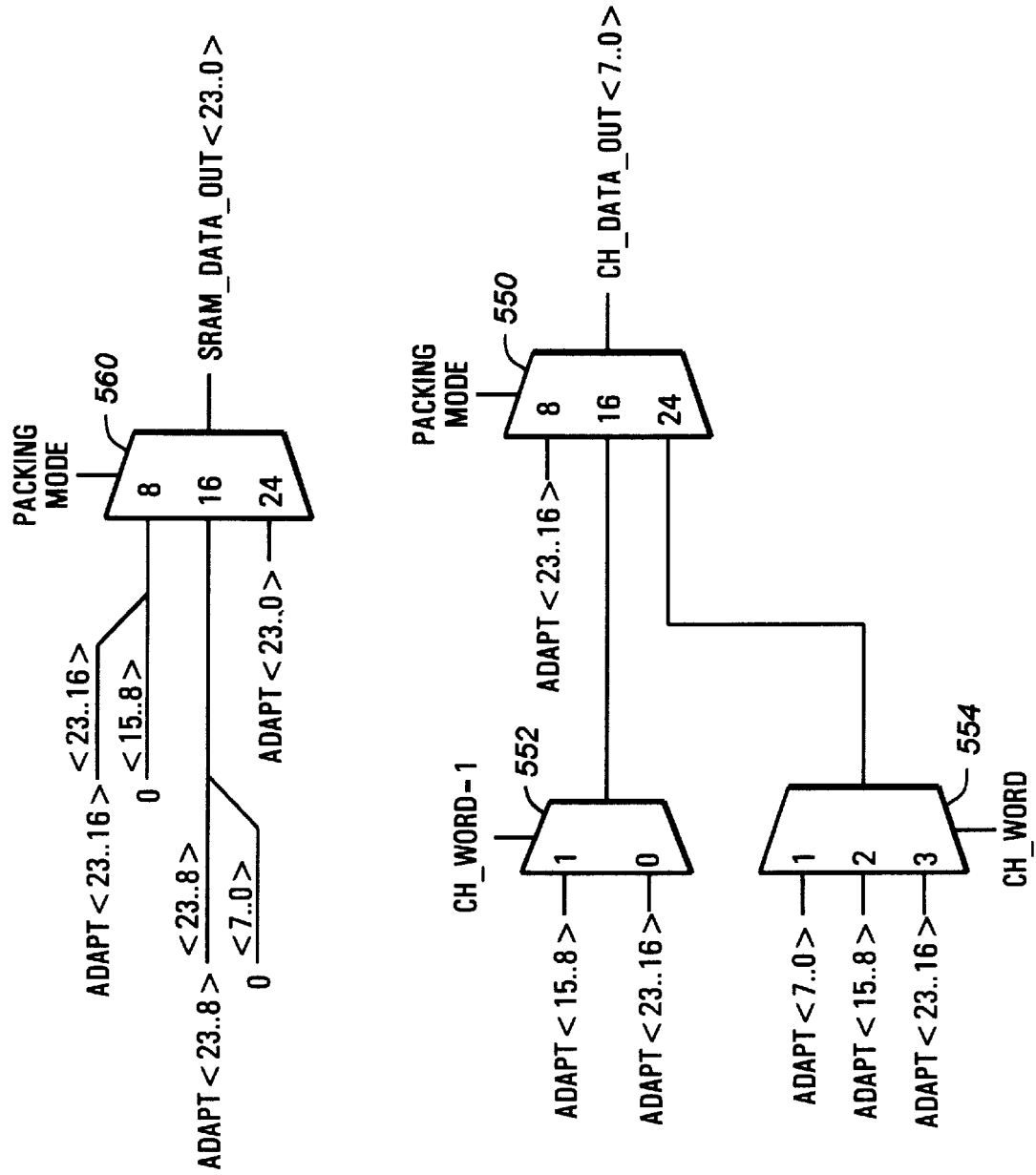
Figure 14C:
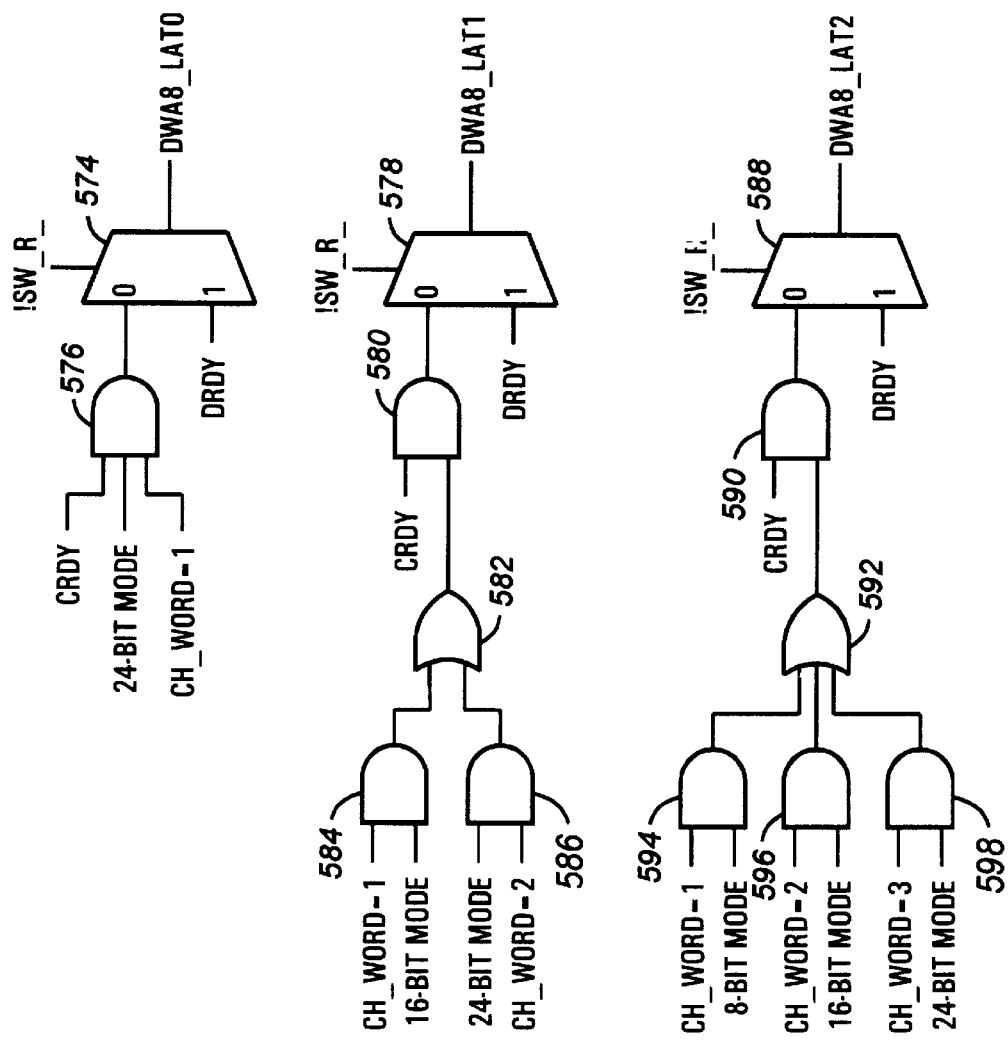

FIGS. 13A, 13B and 13C show the basic multiplexing and latching operations for each of the SYS1 and SYS2 channels 400 and 402, while FIGS. 14A, 14B and 14C show the latching and multiplexing operations for each of the REC, PBK, SRX and STX channels 404–410.

Proceeding now to FIG. 13B, a 16 bit four input multiplexor 420 has as its output the 24 bits of SRAM_DATA_OUT signals provided to the multiplexor 320'. Selection of the input of the multiplexer 420 is provided by the bits in the particular control register that indicate the data packing mode, that is 8, 16, 24 or 32 bits. The 8 bit packing mode input of the multiplexor 420 is connected to the output of a 16 bit, two input multiplexor 422. The one input of the multiplexor 422 has its upper byte connected to ADAPT<15..8> signals and its lower 16 bits connected to a zero level. The ADAPT signals are an internal set of signals provided as the output of a series of latches to be described below. The zero input to the multiplexor 422 receives as its top 8 bits the ADAPT<23..16> signals and as its lower 16 bits a zero level. The selection of the multiplexor 422 is provided by the !SRAM_WORD signal, which indicates which of the two potential SRAM words is being utilized in this mode. Reference is requested to FIG. 11C to see that only one ISA word and two DSP words are being utilized in 8 bit mode. The 16 bit packing mode input to the multiplexor 420 receives the upper 16 bits of the ADAPT signals and has its lower byte connected to a zero level. This is illustrated in FIG. 11B. The 24 bit input of the multiplexor 420 is connected to the output of a 24 bit, two input multiplexor 424 which is selected by the !SRAM_WORD signal. The one input to the multiplexor 424 is connected to the ADAPT<23..0> signals, while the zero input receives at its high two bytes the ADAPT<23..8> signals and at its low byte the OVER_DAT<7..0> signals. The OVER_DAT signals are used when a byte must be obtained from or provided to a second ISA byte from a single DSP word. Reference is requested to FIG. 11A. The 32 bit transfer input of the multiplexor 420 receives the ADAPT<23..0> signals.

The 16 data bits to the ISA_DAT_OUT signals are provided at the output of a 16 bit, four input multiplexor 426. Selection of the multiplexor 426 is provided again by the packing mode signals. The 8 and 16 bit inputs both receive the ADAPT<23..8> signals. The 24 bit input of the multiplexor 426 is connected to the output of a three input, 16 bit multiplexor 428. Selection of the multiplexor 428 is based on the value of the CH_WORD signals. As can be seen in FIG. 11A, in certain cases three ISA words are required for 24 bit mode operation and therefore there are three inputs for the multiplexor 428. The first word transfer input receives the ADAPT<15..0> signals. The second word transfer input receives as its upper byte the ADAPT<7..0> signals and in its lower byte the OVER_DAT<7..0> signals. The third ISA word input of the multiplexor 428 receives the ADAPT<23..8> signals. The 32 bit input of the multiplexor 426 receives its input from a 16 bit, two channel multiplexor 430 which is selected by the CH_WORD signal. As seen in FIG. 11G, two ISA words are required in this operation. The first word input to the multiplexor 430 is connected to the ADAPT<15..8> signals, while the second word input receives a 0 value at its upper byte and the ADAPT<23..16> signals at its lower byte.

Referring then to FIG. 13A, the development of the ADAPT<23..0> and OVER_DAT<7..0> signals are indicated. A series of four 8 bit latches 432, 434, 436 and 438 are used to develop the ADAPT and OVER_DAT signals. The DWA16_LAT2 signal is provided to the gate or enable signal of the latch 432, while the DWA16_LAT1 signal is provided to the enable input of the latch 434. The DWA16_LAT0 signal is provided to the enable input of the latch 436 and the OVER_LAT signal is provided to the enable input of the latch 438. Development of these signals is detailed in FIG. 13C discussed below. The D inputs of the OVER_DAT latch 438 are connected to the output of a 8 bit, two input multiplexor 440. The !SW_R_ signal is used to select the directions. The !SW_R_ signal is used to indicate whether a read or a write DMA transfer is occurring and is based on the transfer direction bit in the channelcontrol register. In the case of a 0 or write operation, the ISA_DATA_IN<15..8> signals are connected to the 0 input of the multiplexor 440 and for the read or 1 condition the SRAM_DATA_IN<23..16> signals are connected to the one input of the multiplexor 440. The latches 432, 434 and 436 develop respectively the most, middle and least significant bytes of the ADAPT signals and are connected to the output of a 24 bit, two input multiplexor 442. The multiplexor 442 has its inputs selected by the !SW_R_ signal. The 0 input is connected to the output of a 24 bit, four input multiplexor 444. Selection of the multiplexor 444 is based on the packing mode signals. The 8 and 16 bit mode inputs to the multiplexor 444 both receive the ISA_DATA_IN<15..0> signals as the two most significant bytes and the ISA_DATA_IN<7..0> signals as the least significant byte. The 24 bit mode input receives the output of a 24 bit, three input multiplexor 446. The multiplexor 446 has its inputs selected by the CH_WORD signals. The one input has its high byte connected to the ISA_DATA_IN<15..8> signals and its lower two bytes connected to the ISA_DATA_IN<15..0> signals. The second word input to the multiplexor 446 receives the ISA_DATA_IN<7..0> signals at each of its three bytes. The third word input of the multiplexor 446 receives as its upper two bytes the ISA_DATA_IN<15..0> signals and at its lower byte receives the ISA_DATA_IN<7..0> signals. The 32 bit mode input of the multiplexor 444 is connected to the output of a 24 bit, two input multiplexor 448. Selection of the multiplexor 448 is provided by the CH_WORD signals. For the first and second word inputs the upper byte is connected to the ISA_DATA_IN<7..0> signals and the lower two bytes are connected to the ISA_DATA_IN<15..0> signals. A third word input is not necessary.

The one or read input to the multiplexor 442 is provided by the output of a 24 bit, four input multiplexor 450. Selection of the multiplexor 450 is done by the packing mode signals. The 8 bit mode inputs of the multiplexor 450 receive the SRAM_DAT<23..16> signals at each of the upper 2 bytes and receives the SRAM_DAT<7..0> signals at the lower byte. The 16, 24 and 32 bit mode inputs of the multiplexor 450 receive the SRAM_DAT<23..0> signals at their inputs.

Referring now to FIG. 13C, logic to develop the latching signals for the latches 432–438 is shown. The OVER_LAT signal is provided at the output of a two input multiplexor 460. The selection input of the multiplexor 460 is provided by the !SW_R_ signal. The zero input of the multiplexer is connected to the output of a three input AND gate 462 which receives at its inputs the CRDY and 24 bit mode signals and a signal indicating that the CH_WORD state is equal to 2. The CRDY signal is an indication that the ISA channel transfer is ready. The one input of the multiplexer 460 receives its input from the output of a three input AND gate 464, whose inputs are the DRDY signal, 24 bit mode signal and !SRAM_WORD signal. The DRDY signal indicates that the DSP bus is available for transfer.

The DWA16_LAT0 signal is provided at the output of a two input multiplexer 466, with the multiplexer input selected by the !SW_R_ signal. The 0 input of the multiplexer 466 receives the output of a three input AND gate 468 whose inputs are the CRDY signal, a signal indicating that the CH_WORD value equals 1 and the output of a two input OR gate whose inputs are the 24 bit mode and 32 bit mode signals. The DWA16_LAT1 signal is provided at the output of a two input multiplexor 472 whose input is selected by the !SW_R_ signal. The 0 input of the multiplexer 472 is connected to the output of a two input AND gate 474 which receives the CRDY signal at one input and the output of a four input OR gate 476 at its second input. Two of the inputs to the OR gate 476 are the 8 bit mode and 16 bit mode signals while a third input is provided by the output of a two input AND gate 478. One input to the AND gate 478 is the 24 bit mode signal while the second input is a signal indicating that the CH_WORD value is not 2. The final input to the OR gate 476 is provided by the output of a two input AND gate 480 whose inputs are the 32 bit mode signal and a signal indicating that the CH_WORD signal is at the first word. The one input to the multiplexor 472 is provided by the output of a two input AND gate 482, one of whose inputs is the DRDY signal. The second input to the AND gate 482 is provided to the output of a two input NAND gate 484 whose inputs are the 8 bit mode signal and the SRAM_WORD signal. The DWA16_LAT2 signal is provided at the output of a two input multiplexor 486 whose input is selected by the !SW_R_ signal. The 0 input is connected to the CRDY signal while the 1 input is connected the output of a two input AND gate 488, one of whose inputs is the DRDY signal. The second input to the AND gate 488 is provided by the output of a two input NAND gate 490 whose inputs are the 8 bit mode signal and the !SRAM_WORD signal.

Figure 15:
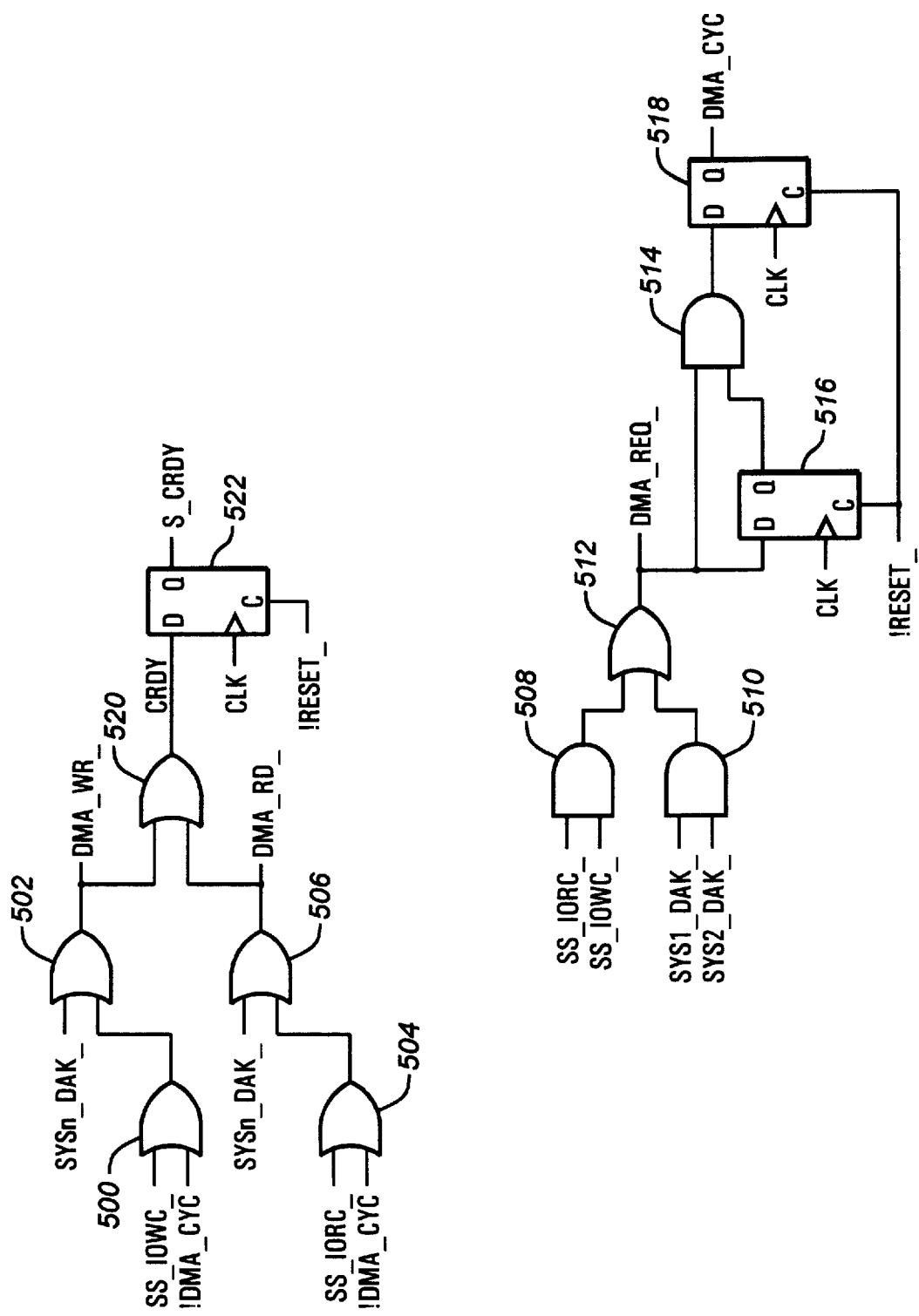
FIGS. 15 and 18 are schematic diagrams of circuitry associated with the circuitry of FIGS. 13A–13C and 14A–14C.

Referring now to FIG. 15 certain logic used by the SYS1 and SYS2 channels is shown. The SS_IOWC_signal and a signal referred to as !DMA_CYC signal are provided as two inputs to an OR gate 500. The output of the OR gate 500 is provided as one input to a two input OR gate 502 whose other input receives the SYSn_DAK_ signal, indicating the DMA request acknowledgement for the particular SYS DMA channel. The output of the OR gate 502 is the DMA_WR_ signal. The SS_IORC_ signal is provided as one input to a two input OR gate 504 whose second input receives the !DMA_CYC signal. The output of the OR gate 504 is provided as one input to an OR gate 506 whose second input is the SYSn_DAK_ signal. The output of the OR gate 506 is the DMA_RD_ signal.

The SS_IORC and SS_IOWC_ signals are the two inputs to an AND gate 508. The SYS1_DAK_ and SYS2_DAK_ signals are two inputs to a two input AND gate 510. The outputs of the AND gates 508 and 510 are provided to the inputs of an OR gate 512. The output of the OR gate 512 is the DMA_REQ_ signal and is provided as one input to a two input AND gate 514 and as the D input of a D-type flip-flop 516. The flip-flop 516 is clocked by the CLK signal. The non-inverted output of the flip-flop 516 is the second input to the AND gate 514, whose output is provided to the D input of a D-type flip-flop 518. The flip-flop 518 is clocked by the CLK signal. The output of the flip-flop 518 is the DMA_CYC signal, indicating that an ISA DMA cycle is occurring.

The !DMA_WR_ and !DMA_RD_ signals are two inputs to a two input OR gate 520. The output of the OR gate 520 is provided to the D input to a D-type flip-flop 522 which is clocked by the CLK signal. The output of the OR gate 520 is the CRDY signal. The non-inverted output of the flip-flop 522 is the S_CRDY or synchronized CRDY output. The S_CRDY signal is used with the CH_WORD state machine of FIG. 16. The state machine starts at state 1 upon reset of the computer system S. If the S_CRDY signal is true and the condition of 8 bit mode or 16 bit mode and an SYS1 or SYS2 channel transfer is not true, control proceeds to state 2. Otherwise control remains at state 1. If the S_CRDY signal is asserted and it is not 16 bit mode or 32 bit mode, control proceeds from state 2 to state 3. If the S_CRDY signal is true, and it is either in 16 bit mode or 32 bit mode, or DMA cycles are no longer in process, control returns to state 1. Otherwise control remains at state 2. If the S_CRDY signal is true or no cycles are in progress, control proceeds from state 3 to state 1. Otherwise control remains in state 3. The CH_WORD signal value is equal to the state number of the state machine.

Figure 17:
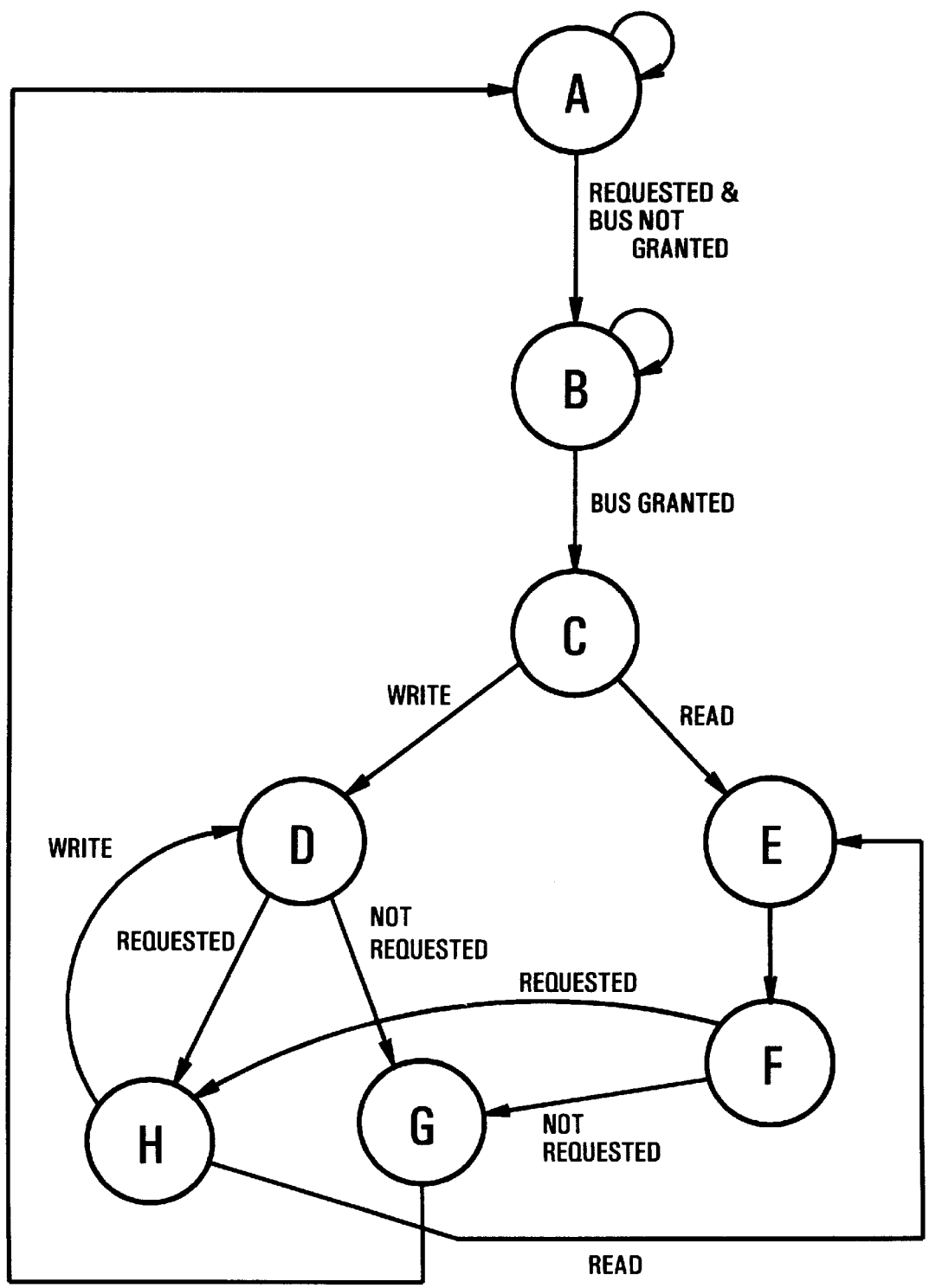

FIG. 17 illustrates the SRAM state machine. This is used to develop the DRDY signal, among others. The other signals include the write and output enable signals provided to the SRAM 156. The SRAM state machine is clocked on the CLK signal. Control starts at state A and advances to state B if a request is present to utilize the SRAM 156 and the DSP bus 152 has not been granted to the interface ASIC 150. Otherwise control remains at state A. Control remains at state B until the bus has been granted to the interface ASIC 150 and then control proceeds to state C. If a write to the SRAM 156 is to occur, control transfers to state D. If a further request is still present indicating more transfers to occur, control then proceeds to state H. From state H control returns to state D if the additional request is a write operation. Otherwise control proceeds from state H to state E on read operations. If a further request was not pending upon exiting of state D, control proceeds to state G. Control then proceeds from state G to state A. If it was a read operation in state C control proceeds to state E. Control always proceeds from state E to state F on the next edge of the CLK signal. If a request was pending in state F, control proceeds to state H. If no request was pending control proceeds to state G. The DRDY signal is changed to a 1 or high level in states D and F and is changed to a 0 or low level upon entry into states G and H.

Figure 18:
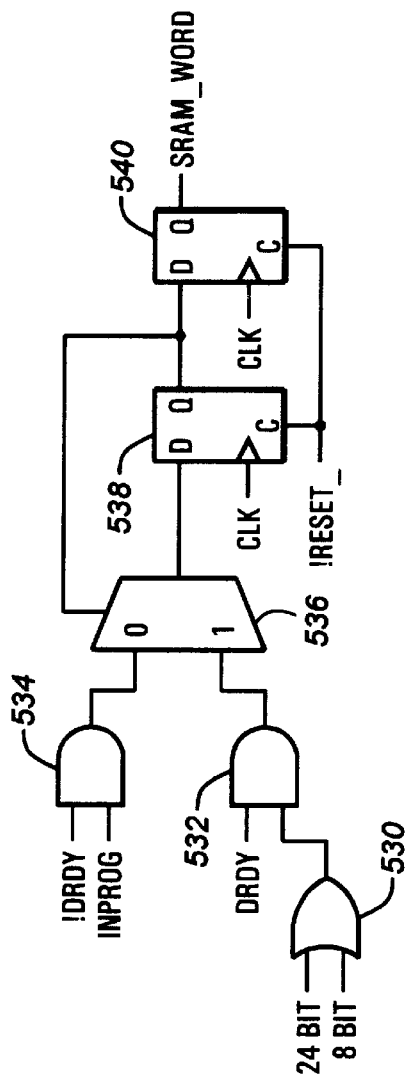

The SRAM_WORD signal is developed as shown in FIG. 18. The 24 bit mode and 8 bit mode signals are provided as inputs to a two input OR gate 530 whose output is one input to a two input AND gate 532. The second input to the AND gate 532 is the DRDY signal. The !DRDY signal and the in progress signal are provided as the two inputs to an AND gate 534. The output of the AND gate 534 is the 0 input to a multiplexor 536, while the output of the AND gate 532 is the one input. The output of the multiplexor 536 is provided to the D input of a D-type flip-flop 538 which is clocked by the CLK signal. The non-inverting output of the flip-flop 538 is connected to the select input of the multiplexor 536 and to the D input of a D-type flip-flop 540. The flip-flop 540 has its inverted clock input receive by the CLK signal. The non-inverting output of the flip-flop 540 is the SRAM_WORD signal.

Therefore the CH_WORD and SRAM_WORD signals properly track the bytes during the various transfers.

Returning now to FIG. 14B, the CH_DAT_OUT<7..0> signals are provided at the output of a three input multiplexor 550. The packed or bit mode signals provide the selection of 8, 16 or 24 bit operation. The 8 bit mode input receives the ADAPT<23..16> signals. The 16 bit mode input is connected to the output of an 8 bit two input multiplexor 552 whose input is selected by the CH_WORD=1 signal. The 1 input is connected to the ADAPT<15..8> signals while the 0 input is connected to the ADAPT<23..16> signals. The 24 bit mode input of the multiplexor 550 is connected to the output of a three input multiplexor 554 whose inputs are selected by the CH_WORD signals. The 1 or first word input receives the ADAPT<7..0> signals while the second word input receives the ADAPT<15..8> signal and the third word input receives the ADAPT<23..16> signals.

The SRAM_DATA_OUT<23..0> signals are provided at the output of a 24 bit, three input multiplexor 560 whose input selection is controlled by the packed or bit selection signals. The 8 bit mode input receives at its most significant byte the ADAPT<23..16> signals and zero values at its lower 2 bytes. The 16 bit mode input receives at its upper 16 bits the ADAPT<23..8> signals and zero values for its lower byte. The 24 bit mode input receives the ADAPT<23..0> signals.

The ADAPT signals for the 8 bit channels are illustrated in FIG. 14A. The 8 bit latches 562, 564 and 566 provide at their outputs the ADAPT<23..0> signals. The DWA8_LAT2 signal is provided to the enable or gate input of the latch 562, while the DWA8_LAT1 signal is provided to the enable input of the latch 564 and the DWA8_LAT0 signal is provided to the enable input of the latch 566. The D inputs of the latches 562, 564 and 566 receive their respective byte inputs from the output of a 24 bit, two input multiplexer 568. The multiplexor 568 is selected by the !SW_R_ signal. The 0 or write input is connected to the output of a three input multiplexor 570 whose input is selected by the packing bit mode signals. The CH_DAT<7..0> signals are provided to each of three bytes of each of three inputs. The one input of the multiplexer 568 is connected to the output of a three input multiplexor 572 whose input is selected by the packing mode signals. The 8 bit mode input of the multiplexor 572 receives the SRAM_DATA_IN<23..16> signals at its upper two bytes and the SRAM_DATA_IN<7..0> signals at its lower byte. The SRAM_DATA_IN<23..0> signals are provided to both the 16 and 24 bit mode inputs.

The latching signals for the multiplexors 562, 564 and 566 are developed as shown in FIG. 14C. The DWA8_LAT0 signal is provided as the output of a two input multiplexor 574. The !SW_R_ signal is used to select the input of the multiplexor 574, with the 1 input being connected to the DRDY signal. The 0 input is connected to the output of a three input AND gate 576 which receives at its inputs the CRDY signal, the 24 bit mode signal and the signal indicating that the CH_WORD state is in state 1. The DWA8_LAT1 signal is provided at the output of a two input multiplexor 578 which is input selected by the !SW_R_ signal, with the 1 input being connected to the DRDY signal. The 0 input is connected to the output of a two input AND gate 580, one of whose inputs is the CRDY signal and whose other input is provided by the output of a two input OR gate 582. One input to the OR gate 582 is connected to the output of a two input AND gate 584 which receives at its inputs 16 bit mode signal and a signal indicating that the CH_WORD signal is in state 1. The second input of the OR gate 582 is connected to the output of a two input AND gate 586 whose two inputs are the 24 bit mode signal and the signal indicating the CH_WORD signal is in state 2. The DWA8_LAT2 signal is provided at the output of a two input multiplexor 588 whose input is selected by the !SW_R_ signal and whose 1 input is connected to the DRDY signal. The 0 input is provided by the output of a two input AND gate 590, one of whose inputs is the CRDY signal. The second input to the AND gate 590 is the output of a three input OR gate 592. The CH_WORD=1 and 8 bit signals are provided to a two input AND gate 594 whose output is one input to the OR gate 592. The CH_WORD=2 and 16 bit mode signals are provided as the inputs to an AND gate 596 whose output is a second input to the OR gate 592. The 24 bit mode and CH_WORD=3 signals are provided as the inputs to a two input AND gate 598 whose output is the third input to the OR gate 592.

Figure 16:
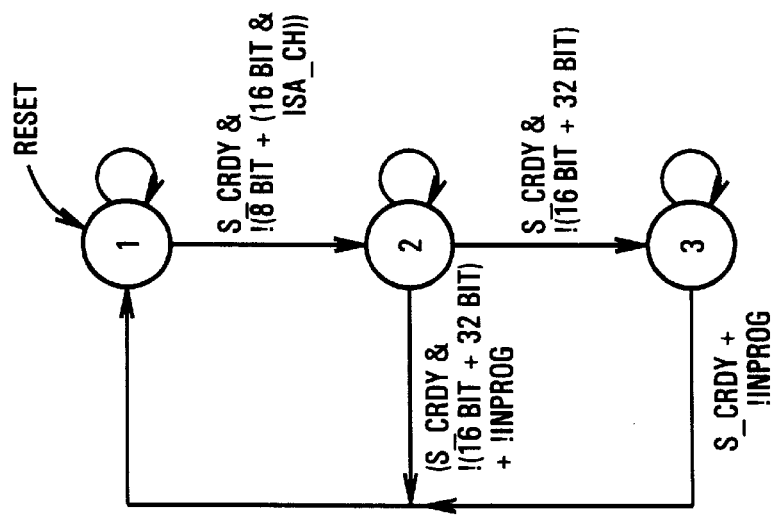
FIGS. 16 and 17 are illustrations of state machines utilized with the circuitry of FIGS. 15 and 18.

The 8 bit channels 404–410 utilize the CH_WORD state machine of FIG. 16 and the SRAM state machine of FIG. 17 to develop the CH_WORD and DRDY signals. The CRDY signal is developed as appropriate depending on the particulars of the audio codec interface 186 and the modem interface 188. Details of the development of the CRDY signal for each interface is not provided but can be readily developed by one skilled in the art.

Therefore the present invention allows improved performance by allowing both a host system processor and a local processor to program a DMA controller transferring data between the local SRAM and the host system. Further, the DMA controller properly realigns and pads data being transferred to adjust for various data packing arrangements and differing widths, removing this task from the processors.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A local direct memory access (DMA) controller for transferring data between a local device and a host device, each of the local and host devices including a processor, the host device further including a host DMA controller writable by the host device processor and operable with the local DMA controller for transfering data between the local device and the host device when the local device and the host device are communicatively coupled, the local DMA controller comprising:

a data transfer channel between the local device and the host device;

control registers for specifying data transfer operations using the data transfer channel, the control registers being writable by the local device processor and the host device processor.

2. The local DMA controller of claim 1, wherein the control registers include a semaphore register for coordinating write operations by the local device processor and the host device processor.

3. The DMA controller of claim 2, wherein the semaphore register includes a single lock bit and an acquisition bit for each of the local device processor and the host device processor.

4. The DMA controller of claim 3, wherein the acquisition bit for each respective device processor is loaded from the lock bit upon a write operation to the lock bit by each device processor.

5. A local direct memory access (DMA) controller for transferring data between a local device and a host device, each of the local and host devices including a processor, the host device further including a host DMA controller writable by the host device processor and operable with the local DMA controller for transfering data between the local device and the host device when the local device and the host device are operatively coupled, the local DMA controller comprising:

a data transfer channel between the local device and the host device;

control registers for specifying data transfer operations using the data transfer channel;

means for allowing the local device processor to write to the control registers; and means for allowing the host device processor to write to the control registers.

6. The local DMA controller of claim 5, wherein the control registers includes a semaphore register for coordinating write operations by the local device processor and the host device processor.

7. The local DMA controller of claim 6, wherein the semaphore register includes a single lock bit and an acquisition bit for each of the local device processor and the host device processor.

8. The local DMA controller of claim 7, wherein the acquisition bit for each respective device processor is loaded from the lock bit upon a write operation to the lock bit by each device processor.

9. A computer system comprising:

a host processor;

a system bus coupled to the host processor; and an expansion device, wherein the expansion device comprises:

a local processor;

a local bus coupled to the local processor; and a DMA controller coupled to the system bus and to the local bus, the DMA controller comprising:

a data transfer channel between the system bus and the local bus;

control registers for specifying data transfer operations using the data transfer channel;

means for allowing the host processor to write to the control registers; and means for allowing the local processor to write to the control registers.

10. The computer system of claim 9, the control registers including a semaphore register for coordinating write operation by the host processor and the local processor.

11. The computer system of claim 10, wherein the semaphore register includes a single lock bit and an acquisition bit for each of the local processor and the host processor.

12. The computer system of claim 11, wherein the acquisition bit for each respective processor is loaded from the lock bit upon a write operation to the lock bit by each processor.

13. The computer system of claim 9, wherein the expansion device further includes local memory coupled to the local bus and wherein the computer system further comprises:

host memory coupled to the system bus; and a host DMA controller coupled to the system bus, writeable by the host processor and operable with the expansion device DMA contoller for transferring data between the local memory and the host memory.

* * * * *